US011620257B2

(12) United States Patent
 Landman

(10) Patent No.: US 11,620,257 B2
(45) Date of Patent: *Apr. 4, 2023

(54) DATA ARCHIVE RELEASE IN CONTEXT OF DATA OBJECT

(71) Applicant: JFrog Ltd., Netanya (IL)

(72) Inventor: Yoav Landman, Netanya (IL)

(73) Assignee: JFrog Ltd., Netanya (IL)

(*) Notice: Subject to any disclaimer, the term of this patent is extended or adjusted under 35 U.S.C. 154(b) by 22 days.

This patent is subject to a terminal disclaimer.

(21) Appl. No.: 17/374,863

(22) Filed: Jul. 13, 2021

(65) Prior Publication Data
US 2021/0342292 A1    Nov. 4, 2021

Related U.S. Application Data

(63) Continuation of application No. 16/931,520, filed on Jul. 17, 2020, now Pat. No. 11,080,233.
(Continued)

(51) Int. Cl.
  *G06F 16/11*    (2019.01)
  *G06F 16/14*    (2019.01)
  (Continued)

(52) U.S. Cl.
  CPC ........... *G06F 16/113* (2019.01); *G06F 9/542* (2013.01); *G06F 16/148* (2019.01); *G06F 16/156* (2019.01); *G06F 16/1824* (2019.01)

(58) Field of Classification Search
  CPC ...... G06F 16/113; G06F 9/542; G06F 16/148; G06F 16/156; G06F 16/1824
  (Continued)

(56) References Cited

U.S. PATENT DOCUMENTS 6,560,618 B1 *   5/2003   Ims .................... G06F 9/445
7,222,233 B1 *   5/2007   Rubin .................. H04L 9/3242
                                                         713/168

(Continued)

OTHER PUBLICATIONS

Cabrera et al., "ADSM: A Multi-Platform, Scalable, Backup and Archive Mass Storage System", Digest of Papers, COMPCON' 95, Technologies for the Information Superhighway, IEEE, 1995, pp. 420-427. (Year: 1995).*

(Continued)

*Primary Examiner* — Phuong Thao Cao
(74) *Attorney, Agent, or Firm* — Norton Rose Fulbright US LLP

(57) ABSTRACT

The present disclosure provides a method, system, and device for generating and managing archived data. To illustrate, an archive request including an indication of a first set of files is received from an entity device. Archive information is generated based on the first set of files and stored at a first storage location and the first set of files are transmitted to an archival storage location. After the storage at the archival storage location, the archive information is accessed from the first storage location based on a retrieval request from the entity device and a request is transmitted to the archival storage location based on the archive information. The first set of files are received from the archival storage location and stored at a second storage location. A notification is sent to the entity device indicating the first set of files are available at the second storage location.

30 Claims, 13 Drawing Sheets

Related U.S. Application Data

(60) Provisional application No. 62/876,559, filed on Jul. 19, 2019.

(51) Int. Cl.
 G06F 16/182 (2019.01)
 G06F 9/54 (2006.01)

(58) Field of Classification Search
 USPC .......................................................... 707/661
 See application file for complete search history.

(56) References Cited

U.S. PATENT DOCUMENTS

| | | | | |
|---|---|---|---|---|
| 7,437,712 | B1* | 10/2008 | Brown | G06F 8/71 717/121 |
| 8,407,190 | B2* | 3/2013 | Prahlad | G06F 3/067 707/692 |
| 8,972,355 | B1* | 3/2015 | Bilsborough | G06F 16/113 707/661 |
| 9,063,938 | B2* | 6/2015 | Kumarasamy | G06F 16/148 707/673 |
| 9,201,883 | B1* | 12/2015 | Stickle | G06F 16/10 |
| 9,823,915 | B1* | 11/2017 | Maloney | G06F 9/4411 |
| 11,144,438 | B1* | 10/2021 | Teixeira | G06F 8/658 |
| 11,157,258 | B2* | 10/2021 | Attard | H04L 9/0894 |
| 2004/0003011 | A1* | 1/2004 | Broussard | G06F 16/951 |
| 2006/0053250 | A1* | 3/2006 | Saze | G06F 3/067 711/170 |
| 2009/0228530 | A1* | 9/2009 | Anglin | G06F 11/1469 |
| 2010/0257140 | A1* | 10/2010 | Davis | G06F 16/113 707/661 |
| 2010/0333116 | A1* | 12/2010 | Prahlad | G06F 3/067 713/153 |
| 2011/0246964 | A1* | 10/2011 | Cox, III | G06F 8/71 717/122 |
| 2012/0266158 | A1* | 10/2012 | Spivak | H04L 67/34 717/175 |
| 2014/0222866 | A1* | 8/2014 | Joneja | G06F 21/6218 707/827 |
| 2014/0250084 | A1* | 9/2014 | Riggins | H04N 21/8545 707/661 |
| 2015/0254254 | A1* | 9/2015 | Kumarasamy | G06F 16/148 707/673 |
| 2016/0216904 | A1* | 7/2016 | Joshi | G06F 3/061 |
| 2016/0378772 | A1 | 12/2016 | Hostetter et al. | |
| 2017/0011048 | A1* | 1/2017 | Wideman | G06F 16/113 |
| 2017/0286437 | A1 | 10/2017 | Stevens et al. | |
| 2018/0129491 | A1* | 5/2018 | Kadam | G06F 16/162 |
| 2018/0307759 | A1 | 10/2018 | Raghavan et al. | |
| 2019/0108246 | A1 | 4/2019 | Jois et al. | |
| 2019/0213265 | A1 | 7/2019 | Boerner et al. | |

OTHER PUBLICATIONS

Rajasekar et al., "Collection-Based Persistent Archives", The 16th IEEE Symposium on Mass Storage Systems in cooperation with the 17th NASA Goddard Conference on Mass Storage Systems and Technologies (Cat. No. 99CB37098), IEEE, 1999, pp. 176-184. (Year: 1999).*

Zhu et al., "IBM Enterprise Content Management and IBM Information Archive: Providing the Complete Solution", IBM Redpaper, Jan. 2011, 158 pages. (Year: 2011).*

International Search Report and Written Opinion issue for PCT Application No. PCT/IB2020/056773, dated Sep. 14, 2020, 18 pages.

* cited by examiner

DATA ARCHIVE RELEASE IN CONTEXT OF DATA OBJECT

CROSS-REFERENCE TO RELATED APPLICATIONS

The present application is a continuation of U.S. patent application Ser. No. 16/931,520 filed Jul. 17, 2020, and entitled "DATA ARCHIVE RELEASE IN CONTEXT OF DATA OBJECT", now issued as U.S. Pat. No. 11,080,233, which claims the benefit of U.S. Provisional Application No. 62/876,559 filed Jul. 19, 2019, and entitled "DATA ARCHIVE RELEASE IN CONTEXT OF DATA OBJECT", the contents of which are incorporated by reference herein in their entirety.

TECHNICAL FIELD

The present application is generally related to the technical field of data storage, and more particularly, but not by way of limitation, to techniques for archival storage and management of one or more archived files.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues. As software is updated and deployed, it may be advantageous to store previous versions of the software in an archive, in case of a potential roll-back (or other reason to access a previous version). Additionally, software or data may be archived (e.g., stored in long term storage) to comply with one or more regulations.

To archive software or other data, the software (e.g., one or more files) may be stored at an archival storage device, such as a cloud-based storage device operated by a third party. Storing and retrieving files can be a time consuming process that requires significant user oversight. For example, a user may issue requests to store or retrieve software and monitor the storage or retrieval process, including sending updated requests when the storage or retrieval process does not operate properly. Additionally, files that are stored at the archival storage device may not be searchable, resulting in difficulties for a user to determine which files to retrieve at a particular time. Further, there is a monetary cost corresponding to storing the files at the archival storage device, which increases with the number of files (or the size of files) that are stored. Thus, archiving software or other data efficiently and cost effectively poses many difficult challenges.

BRIEF SUMMARY

Embodiments of the present disclosure provide systems, methods, and computer-readable storage media that provide for archiving data and for retrieving archived data. For example, a server may receive a request to archive a first set of files and may generate archive information based on the first set of files. The archive information may include checksums corresponding to files of the first set of files, metadata corresponding to files of the first set of files, a checksum corresponding to the entirety of the first set of files, metadata corresponding to an entirety of the first set of files, or any combination thereof. The server may store the archive information at a first storage location, such as in an entry of an archive log, to track archived data to be or that is stored at an archive storage location. The archive storage location may be at an archival storage device, such as a cloud-based storage device operated by a third party. After generation and storage of the archive information at the server, the server may transmit the first set of files to the archival storage device for storage at the archival storage location. By storing the archive information at the server, the server is able to track what files are stored at the archival storage device. Additionally, the archive information may be searchable, for example based on the metadata, to enable a user at an entity device to request retrieval of archived data using queries, such as queries in a native query language.

In some aspects of the present disclosure, a request to retrieve data from the archival storage device is received by the server, the server accesses archive information corresponding to the requested files in order to retrieve the requested files. For example, the archive information may include an archive identifier (ID) that was received when the files were stored at the archival storage device, and the server may use the archive ID (or other information from the archive information) to retrieve the requested files from the archival storage device. After receiving the requested files, the server may store the requested files in a second storage location, such as at a memory of the server, that is accessible to the entity device and may transmit a notification to the entity device indicating that the requested files have been retrieved and are available. In this manner, the server initiates and monitors archiving and retrieval processes without oversight from the user, reducing the amount of user interaction needed. Additionally, the server advantageously stores archive information to enable searching and querying of archived data for retrieval, which enables a user to more easily select what data is to be stored or retrieved from the archival storage device.

According to one embodiment, a method for generating and managing archived data is described. The method includes receiving, by one or more processors, an archive request from an entity, the archive request including an indication of a first set of files, and identifying, by the one or more processors, the first set of files based on the indication. The method further includes generating, by the one or more processors, archive information based on the first set of files. The method also includes initiating, by the one or more processors, storage of the archive information at a first storage location, and initiating, by the one or more processors, transmission of the first set of files to an archival storage location.

According to yet another embodiment, a system for generating and managing archived data is described. The system includes at least one memory storing instructions and one or more processors coupled to the at least one memory. The one or more processors are configured to execute the instructions to cause the one or more processors to receive an archive request from an entity, the archive request including an indication of a first set of files, and retrieve the first set of files from the entity device based on the indication. The one or more processors are further configured to execute the instructions to cause the one or more processors to generate archive information based on the first set of files. The one or more processors can further be configured to execute the instructions to cause the one or more processors to initiate storage of the archive information at a first storage location and initiate transmission of the first set of files to an archival storage location.

According to another embodiment, a computer program product is described that includes a computer-readable storage device, such as a non-transitory computer-readable storage medium, that includes instructions that, when executed by one or more processors, cause the one or more processors to perform operations for generating and managing archived data. The operations include executing a first routine to receive an archive request from an entity, the archive request including an indication of a first set of files. The operations further include executing a second routine to retrieve the first set of files from the entity device based on the indication. The operations also include executing a third routine to generate archive information based on the first set of files, executing a fourth routine to initiate storage of the archive information at a first storage location, and executing a fifth routine to initiate transmission of the first set of files to an archival storage location.

According to another embodiment, a method for management and retrieval of archived data is described. The method includes receiving, by one or more processors, a retrieval request from an entity, the retrieval request including an indication of a first set of files to be retrieved from an archival storage location. The method further includes accessing, by the one or more processors, archive information corresponding to the first set of files, the archive information stored at a first storage location, and initiating, by the one or more processors, transmission of a request to the archival storage location based on the archive information. The method also includes receiving, by the one or more processors, the first set of files from the archival storage location, and initiating, by the one or more processors, storage of the first set of files at a second storage location. The method includes initiating, by the one or more processors, transmission of a notification to the entity based on receiving the first set of files, the notification indicating availability of the first set of files at the second storage location.

According to yet another embodiment, a system for management and retrieval of archived data is described. The system includes at least one memory storing instructions and one or more processors coupled to the at least one memory. The one or more processors are configured to execute the instructions to cause the one or more processors to receive a retrieval request from an entity, the retrieval request including an indication of a first set of files to be retrieved from an archival storage location. The one or more processors are further configured to execute the instructions to cause the one or more processors to access archive information corresponding to the first set of files, the archive information stored at a first storage location, and initiate transmission of a request to the archival storage location based on the archive information. The one or more processors are also configured to execute the instructions to cause the one or more processors to receive the first set of files from the archival storage location, and initiate storage of the first set of files in a second storage location. The one or more processors are also configured to execute the instructions to cause the one or more processors to initiate transmission of a notification to the entity based on receiving the first set of files, the notification indicating availability of the first set of files at the second storage location.

According to another embodiment, a computer program product is described that includes a computer-readable storage device, such as a non-transitory computer-readable storage medium, that includes instructions that, when executed by one or more processors, cause the one or more processors to perform operations for management and retrieval of archived data. The operations include executing a first routine to receive a retrieval request from an entity, the retrieval request including an indication of a first set of files to be retrieved from an archival storage location managed by an archival storage provider distinct from the entity, and executing a second routine to access archive information corresponding to the first set of files, the archive information stored at a first storage location managed by an archival storage coordinator distinct from the entity. The operations further include executing a third routine to initiate transmission of a request to the archival storage location based on the archive information, and executing a fourth routine to receive the first set of files from the archival storage location. The operations also include executing a fifth routine to initiate storage of the first set of files in a second storage location managed by the archival storage coordinator, and executing a sixth routine to initiate transmission of a notification to the entity based on receiving the first set of files, the notification indicating availability of the first set of files at the second storage location.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION OF THE INVENTION

Figure 1:
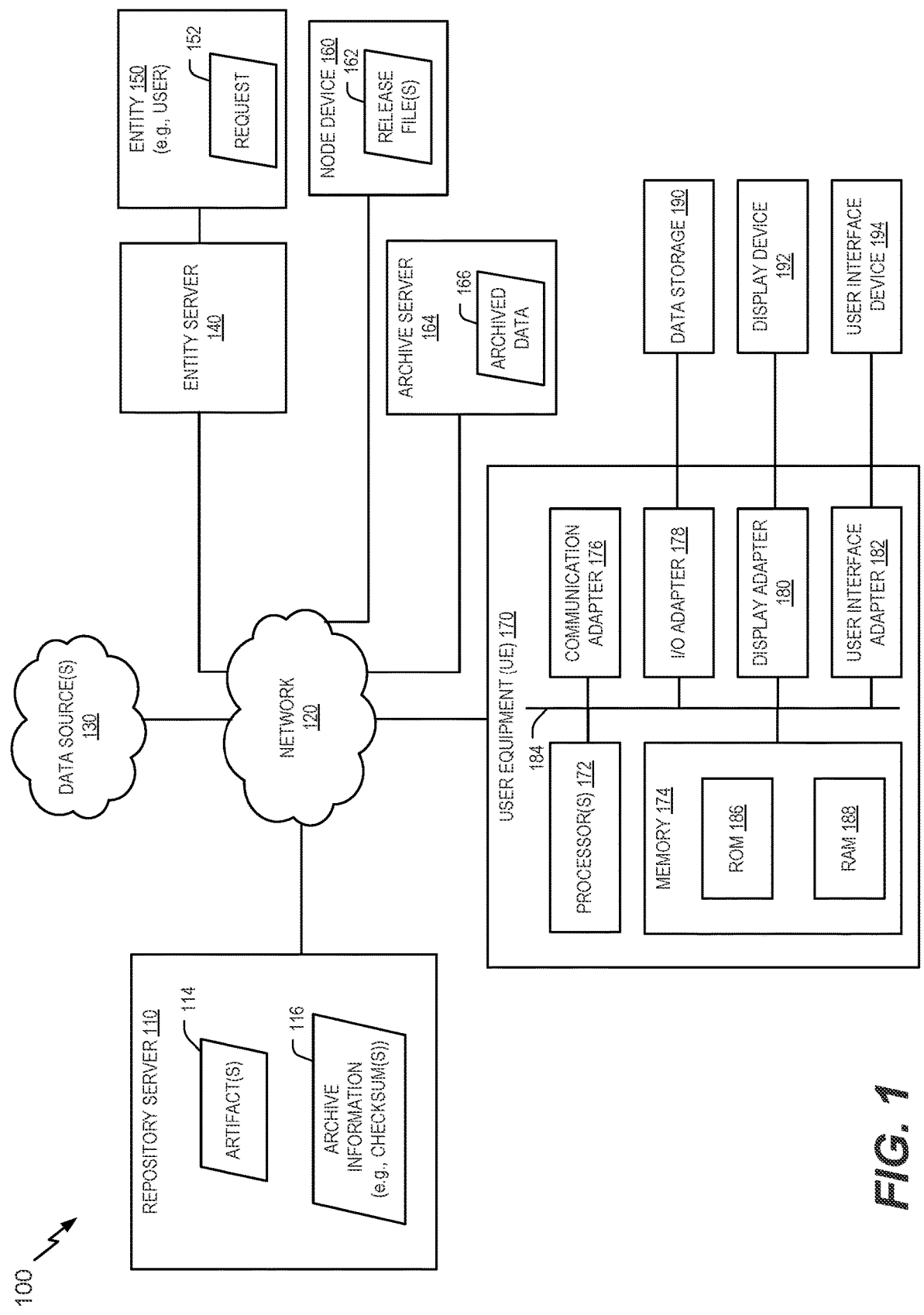
FIG. 1 is a block diagram of an example of a system that includes a server for archival of data.

Inventive concepts utilize a system to archive data and retrieve archived data. To illustrate, an entity or user may indicate a first set of files (e.g., artifacts) to be stored at an archival storage device. For example, the one or more files may correspond to a build job for software. Based on the indication, a server may identify and/or receive the first set of files (or any files of the first set of files that are not already stored at the server) and generate archive information based on the first set of files. The archive information may include, for each file of the first set of files, a checksum corresponding to the file, metadata corresponding to the file, or both. Additionally, the archive information may include a checksum corresponding to an entirety of the first set of files, metadata corresponding to the entirety of the first set of files, or both. The server may store the archive information at a first storage location (e.g., within or accessible to and searchable the server). The first storage location (e.g., the server and corresponding memory) may be managed by an archive storage coordinator that is distinct from the entity.

After generating the archive information, the server may transmit the first set of files to an archival storage location, such as at an archive storage device, for storage. The archival storage device may be an external storage device that is communicatively coupled to the server via one or more networks. In some implementations, the archival storage device may be a cloud-based storage device that is managed by an archive storage provider that is distinct from the entity. In some implementations, the archive storage coordinator is distinct from the archive storage provider. In other implementations, the archive storage coordinator and the archive storage provider are the same party. Storing the first set of files at the archival storage device may satisfy one or more regulatory or compliance requirements. In some implementations, the requested files (e.g., the first set of files) have interdependencies with a second set of files, and the server stores the second set of files along with the first set of files at the archival storage device. The interdependencies may be indicated by the archive information. Thus, the server stores requested files, and files with interdependencies, all based on a single user request. Additionally, the server manages the storage process automatically, such as by sending additional requests to the archival storage device if notification that the files are stored is not received after a threshold period of time. When notification is received, the server may provide a notification to the entity device that indicates that the storage is successful. In some implementations, the notification may receive an archive identifier (ID) or any other confirmation information received from the archival storage device. Additionally, the server may update the archive information to include the archive ID and/or other confirmation information. Thus, the server may monitor and manage the storage process at the archival storage device without oversight from the user.

Additionally, when a user or entity wants to retrieve files from the archival storage device, the server enables searching and/or querying for such information. For example, the archive information stored at the server may be searched (e.g., based on the metadata) or queried, such as in a native query language. The server may send the search results to the entity device, and the user may select the appropriate set of files (e.g., a third set of files) to be retrieved. Alternatively, the entity device may query the server, such as by build job, software release name or version, etc., to select the third set of files. Based on receiving a request to retrieve the third set of files, the server accesses stored archive information corresponding to the third set of files. For example, the server may access the stored archive information to retrieve an archive ID corresponding to the third set of files. Additionally, or alternatively, the archive information may indicate a fourth set of files having interdependencies with the third set of files, such that the fourth set of files should also be retrieved. Based on the archive information (e.g., using the archive ID), the server sends a request to the archival storage device for retrieval of the third set of files. Additionally, the server may update the archive information with addition information, such as a requester of the third set of files, a time of the request, a date of the request, etc.

After sending the request, the server receives one or more files from the archival storage device. The server may monitor the retrieval process. For example, if the files are not received within a particular time period, the server may transmit an updated request for the files (or the remaining files). In some implementations, the server may verify that all of the third set of files have been received. To illustrate, the server may generate second archive information based on the received files and compare the second archive information to the stored archive information. If there is a match, the server verifies that the third set of files has been received, and the server stores the third set of files locally at a second storage location and notifies the entity device that the third set of files are available. If the second archive information does not match the stored archive information, the server determines that one or more files are missing, and the server sends an updated request for the files (or the missing files) to the archival storage device. Thus, the server allows searching and querying of archive information to enable selection of files to be retrieved from the archival storage device, thereby providing a user with options for determining which files to retrieve. Additionally, the server monitors and controls the retrieval process without oversight from the user.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may include a machine- or machines-executable instructions. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, include one or more physical or logical blocks of computer instructions that may be organized as an object, procedure, or function. Nevertheless, the executables of an identified module need not be physically located together, but may include disparate instructions stored in different locations that, when joined logically together, include the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for archiving data and for retrieving archived data is shown and designated 100. System 100 includes a server 110 (e.g., a repository server), a network 120, data sources 130, an entity server 140, an entity 150, a node device 160, user equipment 170, and an archive server 164.

Server 110 may include one or more servers that, according to one implementation, are configured to perform several of the functions and/or operations described herein. One or more of the servers including server 110 may include memory, storage hardware, software residing thereon, and one or more processors configured to perform functions associated with system 100, as described further herein at least with reference to FIGS. 2-4. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of repository server 110 to access and modify aspects (e.g., instructions, applications, data) of repository server 110. For example, components including user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity server 140, entity 150, node device 160, and/or archive server 164.

As shown, server 110 includes one or more artifacts 114 and archive information 116. Artifacts may include one or more binaries (e.g., a computer file that is not a text file). The artifacts may correspond to one or more package types. As non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. To illustrate, a first artifact may correspond to a first package type, such as Maven, and a second artifact may correspond to a second package type, such as Bower. Archive information 116 corresponds to a first set of files of the artifacts 114. Archive information 116 may include an indication of the first set of files and a checksum of each file of the first set of files, metadata corresponding to each file of the first set of files, or both. In some implementations, archive information 116 also includes additional metadata (e.g., file name, file size, path to file, etc.) corresponding to the archive bundle, such as an archive bundle name, a version number, a source identifier, description information, an archive date, a size, etc. Additionally, or alternatively, archive information 116 may include a checksum for an entirety of the first set of files. Additionally or alternatively, archive information 116 may indicate interdependencies between the first set of files and other files of artifacts 114. In some implementations, archive information 116 may include a signature (or other cryptography technique) to render archive information 116 immutable.

Network 120, such as a communication network, may facilitate communication of data between server 110 and other components, servers/processors, and/or devices. For example, network 120 may also facilitate communication of data between server 110 and one or more data sources 130, entity server 140, a node device 160, archive server 164, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. In some implementations, entity 150 includes or is configured to generate (or initiate generation of) a request 152. Request 152 indicates a request for a first set of files to be archived, or to be retrieved from archived storage. Request 152 may include a list of the first set of files, which may correspond to a build job. In some implementations, request 152 may be the result of selection of options provided to entity device 150 in response to a query or a request for archived data. To illustrate, entity 150 may initiate a query by server 110 to identify one or more files corresponding to a particular build job identifier, and the one or more files may be selected for archiving (or for retrieval from archived storage). Additionally, or alternatively, entity device 150 may be provided with a list of data that is archived, and request 152 may correspond to selection of a first set of files from the list of data. Additional details are described with reference to FIGS. 3 and 4.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 includes one or more release files 162. To illustrate, software (e.g., packages), such as the one or more release files 162, hosted at node device 160 may be part of a software release that is transmitted to node device 160.

In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Archive server 164 is configured to archive data (e.g., to store archived data 166). In some implementations, archive server 164 may be operated by an archive storage provider and/or provided as cloud-based storage. In some implementations, the archive storage provider is distinct from entity 150 and an entity that manages repository server 110. In other implementations, the archive storage provider may also manage repository server 110. In some implementations, archive server 164 may be designated for long term storage. Archived data 166 includes data that is archived by server 110. Archived data 166 may include or correspond to data that is identified by request 152. For example, request 152 may indicate a first set of files, and archived data 166 may include the first set of files. Additionally, archived data 166 may correspond to archive information 116. In some implementations, after archived data 166 is stored, archive information 116 may be updated, as further described herein.

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 can include a server and/or cloud-based computing platform configured to perform operations and/or execute the steps described herein. Accordingly, server 110 may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 using a device via one or more networks, such as network 120, which itself can include one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
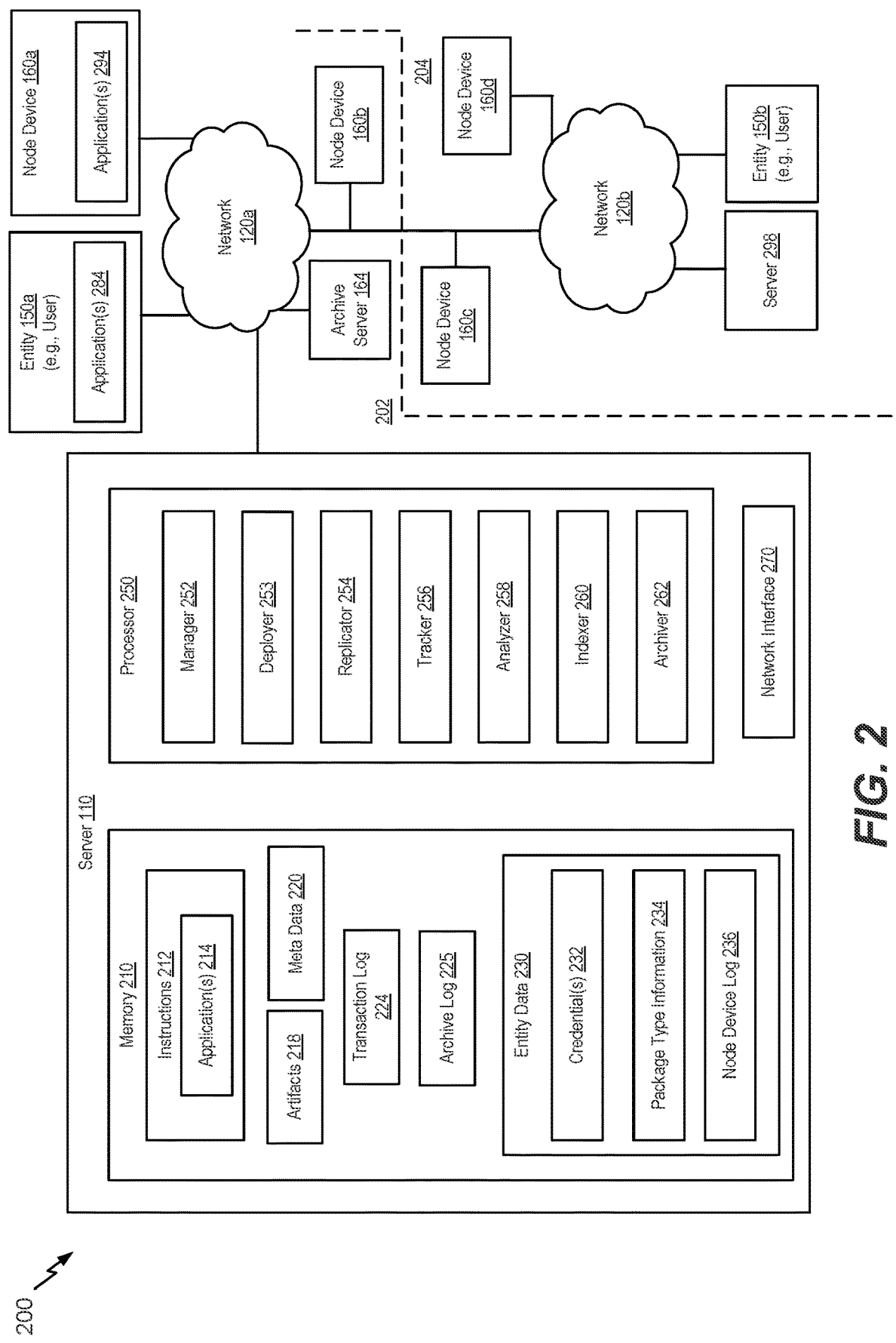
FIG. 2 is a block diagram of another example of a system for archival of data.

Referring to FIG. 2, a block diagram of a system for archiving data and for retrieving archived data according to an embodiment is shown and designated 200. System 200 may include or correspond to at least a portion of system 100. System 200 includes server 110, networks 120a, 120b, entities 150a, 150b, node devices 160a, 160b, 160c, 160d, archive server 164, and a server 298. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 298 is included in second region 204. Server 298 may be a repository server and may include or correspond to server 110. In some implementations, server 110 and server 298 may be included in a universal artifact management system. Networks 120a, 120b may include or correspond to network 120. Each of the entities 150a, 150b may include or correspond to entity 150. In some implementations, a first entity 150a and a second entity 150b may be part of the same group, company, etc., or may be part of different groups, companies, etc. Each of node devices 160a, 160b, 160c, 160d may include or correspond to node device 160. In some implementations, each of node devices 160a, 160b, 160c, 160d corresponds to the same entity. In other implementations, at least one node device of node devices 160a, 160b, 160c, 160d corresponds to another entity.

Archive server 164 is illustrated in FIG. 2 as being included in first region 202. For example, archive server 164 may be a server available to store data in the cloud. In some implementations, archive server 164 is operated by an archive storage provider that is distinct from entities 150*a*, 150*b* (or entity 150). For example, storage and retrieval of archived data may be managed by the archive storage provider. In some implementations, the archive storage provider is distinct from an archive storage coordinator that manages server 110. In other implementations, the archive storage coordinator and the archive storage provider are the same party or entity. In other implementations, archive server 164 is included in second region 204, or in a different region altogether.

Server 110 may include a memory 210 (e.g., one or more memory devices), one or more processors 250, and a network interface 270. Network interface 270 may be configured to be communicatively coupled, via one or more networks (e.g., 120*a*, 120*b*) to one or more external devices, such as one or more of entities (e.g., 150*a*, 150*b*), one or more node devices (e.g., 160*a*, 160*b*, 160*c*, 160*d*), one or more servers (e.g., 164, 298), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, artifacts 218 (e.g., binaries), meta data 220, a transaction log 224, an archive log 225, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150*a* and application 294 at node device 160*a* are configured to enable entity 150*a* and node device 160*a* to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by processor 250. In some such implementations, one or more of the memories may be external to server 110. To illustrate, at least one memory may include or correspond to a database accessible to server 110, such as a database that stores artifacts 218, meta data 220, transaction log 224, archive log 225, entity data 230, or any combination thereof. In some implementations, memory 210 may include or be coupled to cloud storage such that one or more of artifacts 218, meta data 220, transaction log 224, archive log 225, and/or entity data 230 is stored at a cloud storage location and accessible by server 110.

Artifacts 218 may include or correspond to artifacts 114. Meta data 220 may include meta data for artifacts 114, meta data for application 214, meta data for one or more software releases, or any combination thereof. Meta data for an artifact (e.g., 114) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, a quality assurance test passed indicator, as illustrative, non-limiting examples. Meta data for a software release may include a release name, a version number, a time, date, and/or author of the release, one or more target node devices, one or more completed node devices (e.g., node devices that confirmed receipt of the software release), one or more incomplete node devices (e.g., node devices that did not receive the software release), etc.

Transaction log 224 may track one or more transactions such as storage, modification, and/or deletion of an artifact (e.g., 218), meta data (e.g., 220), software release information, permissions, or any combination thereof. In some implementations, transaction log 224 may be utilized to maintain data consistency between servers in different regions, such as server 110 and server 298. To illustrate, in implementations where each server 110, 298 is to have the same set of artifacts (e.g., 218) and/or meta data (e.g., 220), the transaction log 224 provides an indication of what data (e.g., artifacts and/or meta data) needs to be up added, updated, and/or removed between the servers 110, 298.

Archive log 225 may track one or more archived files or data. For example, each entry in archive log 225 may include or correspond to archive information (e.g., 116) that is generated based on archived files. Archive log 225 may maintain the archive information for each set of files that are archived at archive server 164. Archive log 225 may be searchable based on metadata included in the entries of archive log 225.

Entity data 230 may include data associated with one or more entities. For example, entity data 230 may include or correspond to one or more of entity 150*a*, 150*b*. Entity data 230 may include one or more credentials 232, package type information 234, and a node device log 236. Credential 232 include login information to enable one or more users and/or one or more entities to access server 110. Additionally, or alternatively, credential 232 may include security or authentication information, such as a private key and/or public key of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, software information (e.g., name, version number, size, etc.) installed at one or more node devices, or any combination thereof, as illustrative, non-limiting examples.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, an indexer 260 and an archiver 262. In some implementations, processor 250 may include one or more modules. For example, each of manager 252, deployer 253, replicator 254, tracker 256, analyzer 258, indexer 260, and archiver 262 may include or correspond to one or more modules. In an implementation, server 110 (e.g., processor 250 or modules 252, 253, 254, 256, 258, 260, 262) may be configured to execute one or more routines that perform various operations as described further herein. A module is "[a] self-contained hardware or software component that interacts with a larger system." Alan Freedman, "The Computer Glossary" 268 (8th ed. 1998). A module may include a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260, 262) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260, 262) of processor 250. In some implementations, manager 252 may enable administration of multiple instances of a user account, such as a first instance at server 110 and a second instance at server 298. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260, 262) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., the processor 172 of FIG. 1) or processor 250 to enable a user (e.g., 150a) to manage one or more other components/modules (e.g., 253, 254, 256, 258, 260, 262) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. A release bundle may include one or more files and/or release bundle information which includes or indicates a list of the one or more files (e.g., artifacts) to be included in the release bundle and meta data (e.g., properties) associated with the release bundle. The release bundle information may include, for each file of the release bundle, a checksum (of the file), meta data (corresponding to the file), or both. In some implementations, the release bundle also includes additional meta data (e.g., file name, file size, path to file, etc.) corresponding to the release bundle, such as a release bundle name, a version number, a source identifier, description information, release date, a size. Additionally, or alternatively, the release bundle information may include a signature (or other cryptography technique) to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more nodes devices (e.g., 160a, 160b, 160c, 160d). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution as described herein.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 298, between server 110 and one or more of node devices 160a, 160b, 160c, 160d, or both. In some implementations, replicator 254 is configured to be used in conjunction with deployer 253 to distribute a software release, provide efficient network utilization by optimizing replication, and reduce network load and release bundle synchronization time from source device (e.g., server 110) to target instance (e.g., server 298) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 298 or a node device), and initiate transfer of one or more portions of a file (e.g., less then all of the multiple files) to the second device. Additionally, or alternatively, replicator 254 may be used in conjunction with archiver 262 to identify a difference between at least one file stored at archive server 164 and one or more files to be archived, and to initiate transfer of one or more portions of a file (less than all of the one or more files) to archive server 164. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more artifacts, meta data, one or more release bundles, or any combination thereof, deployed or attempted to be deployed to a node device, such as one or more of node devices 160a, 160b, 160c, 160d. Additionally, tracker 256 may be configured to track archived data, for example by storing information indicative of archived data, such as a time when data is archived, a time when requested to be archives, an author of an archive request, a time when requested to be retrieved, a time when retrieved, an author of a retrieval request, etc. In some implementations, tracker 256 includes a tracker module that includes one or more routines, executable by one or more processors (e.g., the processor 172 of FIG. 1) or processor 250 to track one or more artifacts, meta data, one or more release bundles, or any combination thereof deployed or attempted to be deployed to a node device, such as one or more of node devices 160*a*, 160*b*, 160*c*, 160*d*, and/or one or more servers.

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, analyzer 258, and/or archiver 262. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Archiver 262 may be configured to provide data storage and retrieval capability with reference to archived data storage, such as archive server 164. Archiver 262 may be configured to enable archival (e.g., storage) of files or data in archive server 164 and retrieval of files or data from archive server 164. Archiver 262 may perform the operations corresponding to storing and/or retrieving data from an external data source (e.g., archiver server 164), such as initiating the process, monitoring the process, and completing the process with minimal user interaction. Thus, archiver 262 reduces user oversight of the archiving (or retrieving) process. In some implementations, archiver 262 includes an archive module that includes one or more routines, executable by one or more processors (e.g., the processor 172 of FIG. 1) or processor 250 to provide an data storage and retrieval capability from archive server 164.

Figure 3:
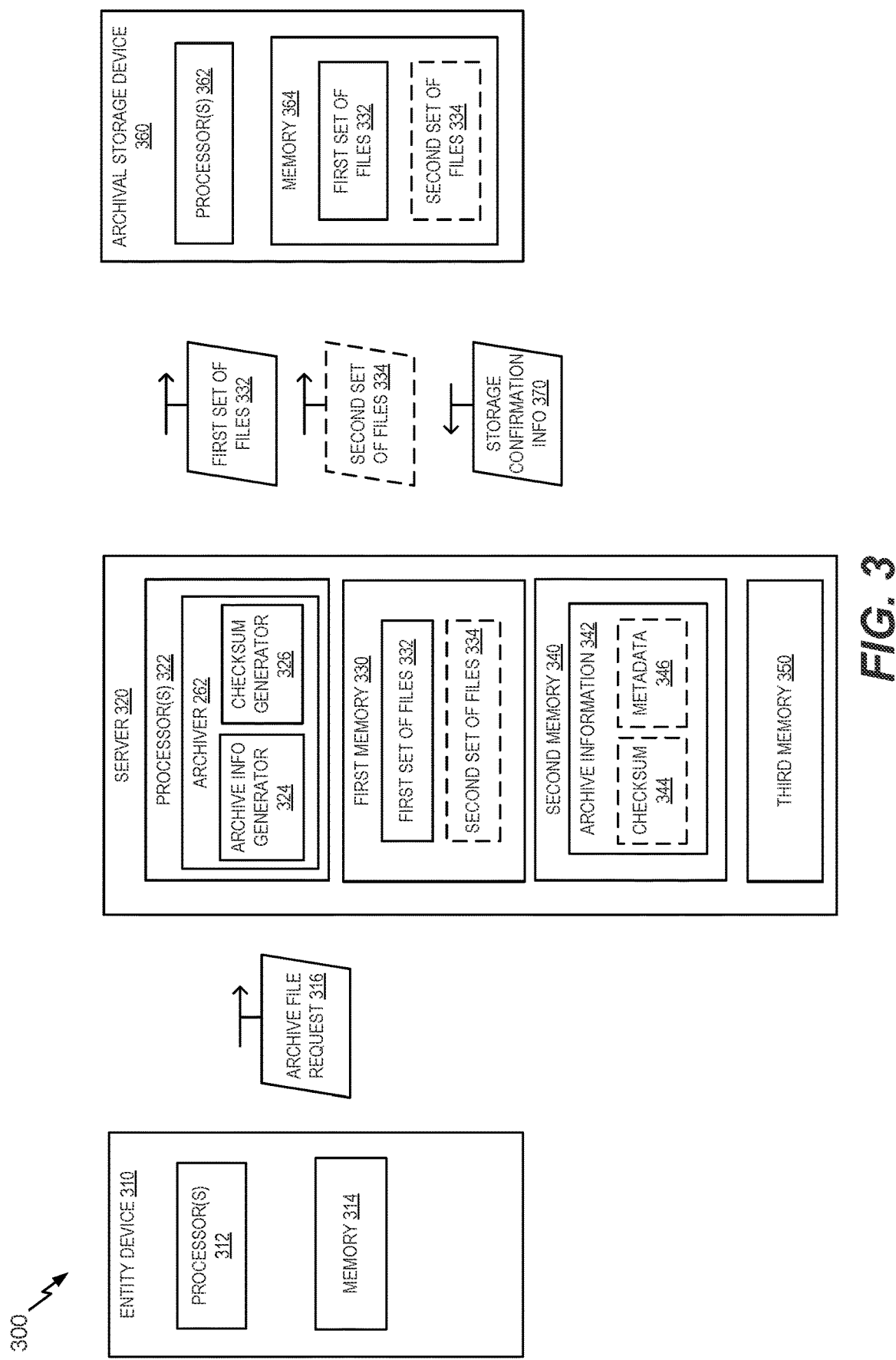
FIG. 3 is a block diagram of another example of a system to store data.
Figure 4:
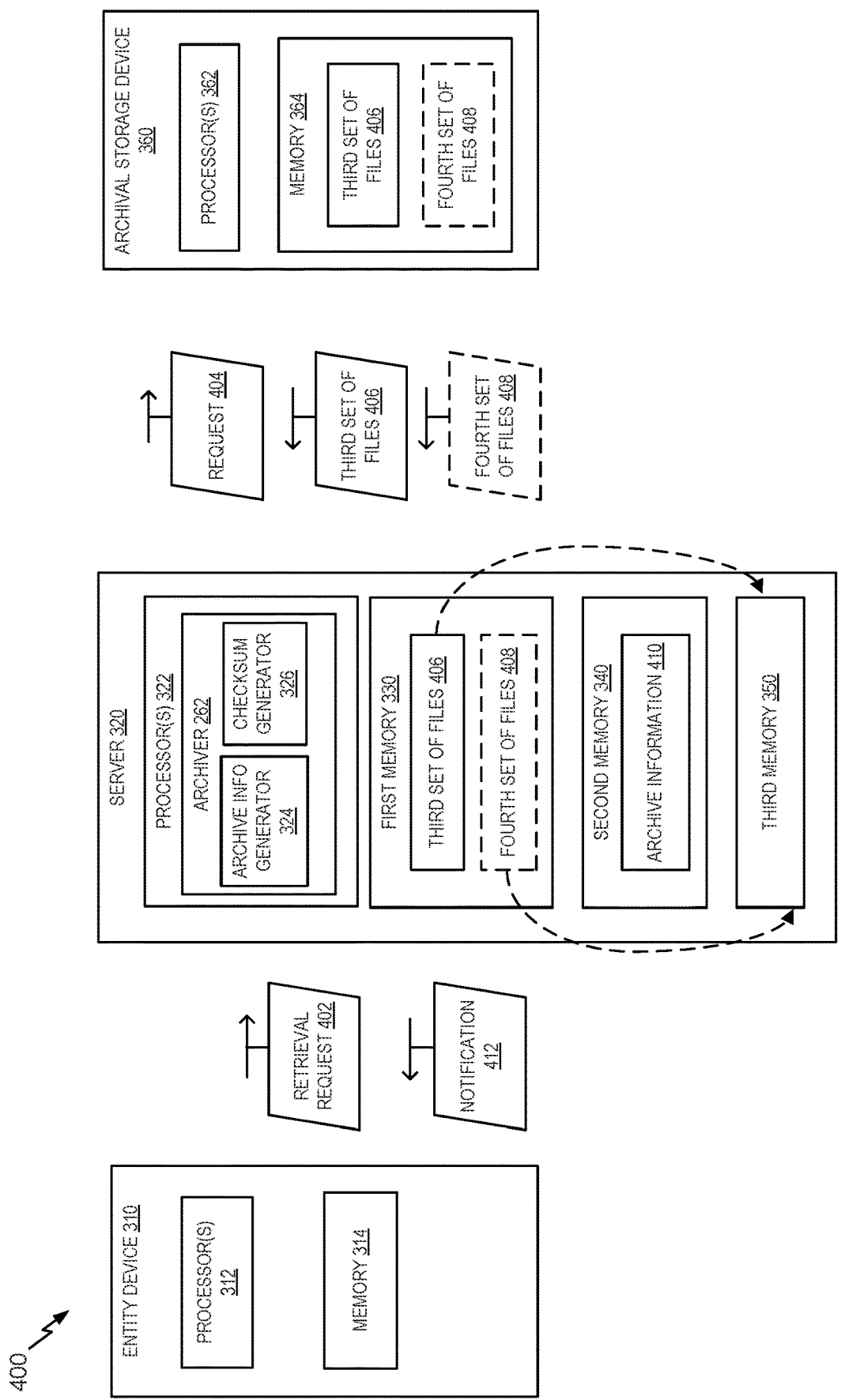
FIG. 4 is a block diagram of an example of a system to retrieve data.

FIGS. 3 and 4 are block diagrams of systems for storing and retrieving data. For example, FIG. 3 shows a block diagram of a system 300 for storing data, and FIG. 4 shows a block diagram of a system 400 for retrieving data. Each of system 300 and system 400 may include or correspond to at least a portion of system 100 and/or system 200. Although described separately, the system 300 and the system 400 may be the same system. Accordingly, operations described with reference to system 300 may be performed by system 400, and vice versa.

Referring to FIG. 3, system 300 includes an entity device 310, a server 320, and an archival storage device 360. Entity device 310, server 320, and archival storage device 360 may be coupled via one or more networks, such as network 120. Entity device 310 may include or correspond to entity server 140, entity 150, 150*a*, 150*b*, or any combination thereof. Server 320 may include or correspond to server 110, server 298, or a combination thereof. Archival storage device 360 may include or correspond to archive server 164.

Entity device 310 includes one or more processors 312 and a memory 314. Memory 314 may include instructions (not shown) that are executable by processor 312 to cause processor 312 to perform one or more operations. In some implementations, the instructions may include or be arranged as an application, such as application 284 (e.g., a software program), associated with server 320. Although system 300 is described as including one entity device 310, in other implementations, system 300 may include multiple entity devices (e.g., 310) coupled to server 320.

Server 320 includes one or more processors 322 and one or more memories. Processor 322 includes archiver 262. Archiver 262 includes an archive information generator 324 and a checksum generator 326. For example, each of archive information generator 324 and checksum generator 326 may include or correspond to one or more modules or submodules. Although archiver 262 is described as including archive information generator 324 and checksum generator 326, in other implementations, one or both of archive information generator 324 and checksum generator 326 may be distinct from archiver 262.

Archive information generator 324 is configured to generate archive information, such as archive information 116. In some implementations, archive information generator 324 includes an archive information generator module that includes one or more routines, executable by one or more processors (e.g., the processor 172 of FIG. 1 or processor 250 of FIG. 2) or processor 322 to generate archive information (e.g., 116) as described herein.

Checksum generator 326 is configured to generate a checksum based on one or more files, metadata corresponding to the one or more files, or any combination thereof. In some implementations, checksum generator 326 includes a checksum generator module that includes one or more routines, executable by one or more processors (e.g., the processor 172 of FIG. 1 or processor 250 of FIG. 2) or processor 322 to generate a checksum based on one or more files, metadata corresponding to the one or more files, or any combination thereof.

The one or more memories may include or correspond to memory 210. As shown, the one or more memories include a first memory 330, a second memory 340, and a third memory 350. Although described as including three memories, in other implementations, server 320 may include more than three memories or fewer an three memories, such as a single memory. Additionally, or alternatively, in other implementations, at least one memory of the one or more memories includes one or more logical or virtual portions. For example, first memory 330, second memory 340, and third memory 350 may be logical or virtual portions of a single memory.

First memory 330 includes one or more artifacts, such as artifacts 218. The one or more artifacts include a first set of files 332 (e.g., a first set of one or more artifacts) and a second set of files 334 (e.g., a second set of one or more artifacts). In some implementations, the first set of files 332 may include one or more interdependencies with the second set of files 334.

Second memory 340 includes archive information 342. Archive information 342 may include or correspond to archive information 116. Archive information 342 may include a checksum 344, metadata 346, or a combination thereof. In some implementations, second memory 340 may also include an archive log (e.g., 225).

Third memory 350 is configured to receive and store one or more files. For example, third memory 350 is configured to store one or more artifacts from archival storage device 360. Additionally, or alternatively, the one or more artifacts stored at the third memory 350 may be provided to or made accessible to processors 322 and/or entity device 310. Use of third memory 350 is described further herein with reference to FIG. 4.

Although system 300 is described as including one server 320, in other implementations, system 300 may include multiple servers (e.g., 320) coupled to entity device 310 and/or archival storage device 360. Additionally, or alternatively, it is noted that server 320 (e.g., processor 322) may include one or more additional components or modules, such as manager 252, deployer 253, replicator 254, tracker 256, analyzer 258, and/or indexer 260, as illustrative, non-limiting examples.

Archival storage device 360 includes one or more processors 362 and a memory 364 (e.g., one or more memories). Memory 364 may include instructions (not shown) that are executable by processor 362 to cause processor 362 to perform one or more operations. Additionally, or alternatively, memory 364 may include one or more files, such as one or more artifacts. Memory 364 may be configured to archive data (e.g., store one or more files) and to provide the archived data to one or more other devices (e.g., server 320) upon request. In some implementations, archival storage device 360 is managed by an archival storage provider distinct from the entity and provides storage capability to multiple customers.

Although system 300 is described as including one archival storage device 360, in other implementations, system 300 may include multiple archival storage devices (e.g., 360) coupled to server 320. Additionally, or alternatively, the multiple archival storage devices may be operated by the same or different entities. For example, multiple archival storage devices may be operated by a single entity. Alternatively, a first archival storage device may be operated by a different entity than a second archival storage device. The multiple archival storage devices may have different accessibility speeds, different costs per storage (e.g., storage size), different rules regarding what or how data may be stored, or other differences.

During operation of system 300, entity device 310 generates and transmits an archive file request 316 to server 320. Archive file request 316 may include an indication of first set of files 332 to be archived at archival storage device 360. In some implementations, archive file request 316 may include first set of files 332 (or first set of files 332 may be transmitted with archive file request 316). In some implementations, archive file request 316 may represent a selection based on a query of server 320. For example, entity device 310 may issue a query for a particular build job or software release, and the results of the query may be provided from server 320 to entity device 310. The results may be displayed at entity device 310, and a selection of first set of files 332 may be indicated by archive file request 316.

Server 320 receives archive file request 316 and identifies first set of files 332. In some implementations, server 320 already stores the files corresponding to first set of files 332, and the files are identified and stored locally in temporary storage (e.g., first memory 330), transaction storage, working storage, a cache storage, or a volatile memory, as non-limiting examples. Alternatively, server 320 may receive first set of files 332 from entity device 310 and store first set of files 332 locally (e.g., at first memory 330). In some implementations, first memory 330 may be a cache or other short term storage.

Server 320 may generate archive information 342. For example, archive information generator 324 of archiver 262 may generate archive information 342. Archive information 342 may include checksums 344 and metadata 346. Checksums 344 may be generated by checksum generator 326 of archiver 262. Archive information 342 (e.g., checksums 344 and metadata 346) is based on first set of files 332. In some implementations, first set of files 332 includes one or more parts, and generating checksums 344 includes generating a checksum corresponding to each part. Each part may correspond to a single file, a portion of a file, or a combination of multiple files (or multiple portions of multiple files). Additionally, or alternatively, generating checksums 344 may include generating a checksum for an entirety of first set of files 332. Generating archive information 342 may also include generating metadata 346. Metadata 346 may include metadata corresponding to each file of first set of files 332, such as file name, size, path, etc., metadata corresponding to the entirety of first set of files 332, such as bundle name, a version number, a description, a release date, etc., or both. In some implementations, metadata 346 may include an indication of whether first set of files 332 successfully completed one or more development stages of a development process, for example at entity device 310. In some implementations, archive information 342 may be signed, or another cryptography technique may be used, such that archive information 342 is immutable. Alternatively, archive information 342 may be updated after storage, as further described herein with reference to FIG. 4.

After generating archive information 342, server 320 stores archive information 342 at second memory 340 (e.g., a first storage location). For example, a first storage location may refer to an address at second memory 340. In some implementations, second memory 340 may be a non-volatile memory that is designated to store archive information for multiple archive bundles (and an archive log (e.g., 225)). The second memory 340 is distinct from first memory 330, such that first set of files 332 and archive information 342 are stored at different storage locations.

After storing archive information 342 at second memory 340, server 320 transmits first set of files 332 to archival storage device 360 for storage. Archival storage device 360 may receive first set of files 332 and store first set of files 332 at memory 364 (e.g., an archival storage location). For example, an archival storage location may refer to an address at memory 364. Memory 364 may be a non-volatile memory that is configured for long-term storage of data.

In a particular implementation, second set of files 334 shares interdependencies with first set of files 332. In such implementations, archive information 342 is generated based on both first set of files 332 and second set of files 334. Additionally, in such implementations, server 320 transmits second set of files 334 to archival storage device 360 for storage. Thus, files that have interdependencies with selected files are also archived, such that the files are retrieved together from the archival storage device 360. For example, first set of files 332 may include five files (e.g., artifacts), and there may be forty-five files that share interdependencies with the five files, therefore second set of files 334 includes the forty-five files, and all fifty files are stored together at (and retrieved together from) archival storage device 360.

After transmitting first set of files 332 (or both first set of files 332 and second set of files 334) to archival storage device 360, server 320 may receive storage confirmation information 370 from archival storage device 360. Storage confirmation information 370 may include an archive identifier (ID) associated with the stored files or other information, such as a date and/or time of storage, a size of the data stored, a cost to store the data, or a combination thereof. After receiving storage confirmation information 370, server 320 may update archive information 342 based on storage confirmation information 370. For example, server 320 may update metadata 346 to include the archive ID.

In some implementations, server 320 may select archival storage device 360 from among a plurality of archival storage devices for storing first set of files 332. Server 320 may select archival storage device 360 based on characteristics of archival storage device, characteristics of first set of files 332 (e.g., as indicated by archive information 342), or both. For example, server 320 may select archival storage device 360 based on a cost of storage at archival storage device 360, a speed that data is capable of being retrieved from archival storage device 360, a frequency of retrieval expected for first set of files 332, a type of first set of files 332, a size of first set of files 332, or other considerations. Additionally, or alternatively, server 320 may select archival storage device 360 based on selection of archival storage device 360 by entity device 310.

In some implementations, server 320 may store less than all of the files selected by entity device 310 at archival storage device 360. For example, after storing first set of files 332 at archival storage device 360, server 320 may receive a request to store a third set of files. First set of files 332 and the third set of files may correspond to the same software release, with the third set of files being a newer version of the software release. In such implementations, server 302 may generate second archive information based on the third set of files and may store the second archive information at second memory 340. Server 320 may also determine a difference between the third set of files and first set of files 332, and server 320 may transmit only files corresponding to the difference to archival storage device 360 for storage. In some implementations, the difference may be determined, and the files replicated, by replicator 254. In this manner, newer versions of a software release can be archived by storing files that are different between the newer version and the previous version. Thus, storage space at archival storage device 360 may be reduced, as compared to storing the entirety of each version, which may reduce costs associated with using archival storage device 360.

According to yet another embodiment, a system for archiving data is described. The system includes at least one memory (e.g., 330) storing instructions and one or more processors (e.g., 322) coupled to the at least one memory. The one or more processors are configured to execute the instructions to cause the one or more processors to receive an archive request (e.g., 316) from an entity (e.g., 310), the archive request including an indication of a first set of files (e.g., 332), and retrieve the first set of files from the entity device. The one or more processors are further configured to execute the instructions to cause the one or more processors to generate archive information (e.g., 342) based on the first set of files. The one or more processors can further be configured to execute the instructions to cause the one or more processors to initiate storage of the archive information at a first storage location (e.g., 340) managed by an archival storage coordinator distinct from the entity and initiate transmission of the first set of files to an archival storage location (e.g., 360) managed by an archival storage provider distinct from the entity.

According to another embodiment, a computer program product is described that includes a computer-readable storage device, such as a non-transitory computer-readable storage medium, that includes instructions that, when executed by one or more processors (e.g., 322), cause the one or more processors to perform operations for archiving data. The operations include executing a first routine to receive an archive request (e.g., 316) from an entity (e.g., 310), the archive request including an indication of a first set of files (e.g., 332). The operations further include executing a second routine to retrieve the first set of files from the entity device. The operations also include executing a third routine to generate archive information (e.g., 342) based on the first set of files, executing a fourth routine to initiate storage of the archive information at a first storage location (e.g., 340) managed by an archival storage coordinator distinct from the entity, and executing a fifth routine to initiate transmission of the first set of files to an archival storage location (e.g., 360) managed by an archival storage provider distinct from the entity.

Thus, FIG. 3 describes a system (e.g., 300) for the generation, management, and storage of archived data. For example, server 320 manages storage of archived data by generating and storing archive information (e.g., at second memory 340) along with transmitting the corresponding files to archival storage device 360 for storage. The archive information may be searched or queried, improving utility of the system. For example, the archive information may be searched by file, by author, by date of archive, etc. The system may archive data periodically (e.g., every day, every week, etc.) or whenever a particular change (e.g., storage of a new version of an artifact, a change in administrative rights of a user, when a particular amount of data is stored) occurs. The archiving can be triggered by a user or be automatic. Additionally, server 320 manages the archiving of the data substantially without user input, which reduces manpower used to archive data.

Referring to FIG. 4, shows a block diagram of a system 400 for retrieving data. System 400 includes entity device 310, server 320, and archival storage device 360, as described with reference to FIG. 3.

During operation of system 400, entity device 310 transmits a retrieval request 402 to server 320. Retrieval request 402 includes an indication of third set of files 406 to be retrieved from archival storage device 360 (e.g., from an archival storage location). For example, retrieval request 402 may include a list of files, an identifier (e.g., a build job identifier, a software release identifier, etc.) associated with third set of files 406, or some other indication of third set of files 406.

In some implementations, retrieval request 402 may be a result of a search. For example, entity device 310 may transmit a search parameter to server 320. Server 320 may transmit to entity device 310 information indicating a plurality of archive information satisfying the search parameter. In such an implementation, retrieval request 402 may include a selection of archive information from the plurality of archive information. Additionally, or alternatively, entity device 310 may transmit a request for archived file information to server 320. Server 320 may transmit, to entity device 310, archived file information indicating a plurality of archived information that corresponds to files stored at archival storage device 360. In such an implementation, retrieval request 402 may include a selection of archive information from the plurality of archive information.

After receiving retrieval request 402, server 320 accesses archive information 410 corresponding to third set of files 406 (as indicated by retrieval request 402). For example, archive information 410 may include or correspond to archive information 342. Archive information 410 may include storage confirmation information, such as an archive ID, associated with the stored files. Archive information 410 may be accessed from second memory 340 (e.g., a first storage location). Additionally, in some implementations, server 320 may update archive information 410 with additional information. For example, the additional information may include a requester of third set of files 406, a time of a request, a date of a request, a search term corresponding to the request, other information, or any combination thereof.

After accessing archive information 410, server 302 may transmit a request 404 to archival storage device 360 based on archive information 410. As a non-limiting example, request 404 may include storage confirmation information, such as the archive ID, that is accessed from archive information 410. Additionally, or alternatively, request 404 may indicate third set of files 406. Server 302 may receive third set of files 406 from archival storage device 360 and store third set of files 406 at first memory 330 (e.g., a second storage location). In some implementations, the archive ID (or other storage information) may be included in retrieval request 402 and used to access archival storage device 360. In some implementations, the storage information includes an identifier, a storage date, a user identifier, a duration of storage, or any combination thereof, and may be accessed from archive information 410 or included in retrieval request 402.

In some implementations, a fourth set of files 408 may share interdependencies with third set of files 406. In such implementations, archive information 410 may indicate the relationship between third set of files 406 and fourth set of files 408, and request 404 may be for both third set of files 406 and fourth set of files 408. In addition to retrieving third set of files 406, fourth set of files 408 may also be retrieved from archival storage device 360 and stored at first memory 330.

After receiving third set of files 406 (or third set of files 406 and fourth set of files 408), server 302 may transmit a notification 412 to entity device 310 based on receiving third set of files 406. Notification 412 may indicate availability of third set of files 406 (and fourth set of files 408) at first memory 330 (e.g., at a second location). For example, a second location may refer to an address at first memory 330. In some implementations, responsive to notification 412, entity device 310 may transmit a request to server 320. The request may indicate a third storage location. Based on the request, server 320 may transfer third set of files 406 (and fourth set of files 408) to third memory 350 (e.g., the third storage location). For example, the third location may refer to an address at third memory 350. Third memory 350 may represent a longer term storage location that first memory 330 that is also accessible to entity device 310. Additionally, or alternatively, third set of files 406 (and fourth set of files 408) may be transmitted from server 302 to entity device 310.

In some implementations, server 320 may store third set of files 406 (and fourth set of files 408) at first memory 330 for a limited amount of time. For example, server 320 may determine whether a threshold time period has elapsed since storage of third set of files 406 (and fourth set of files 408) at first memory 330. If the threshold time period has elapsed (without additional instructions), server 320 may delete third set of files 406 (and fourth set of files 408). Additionally, or alternatively, server 320 may receive a user request from entity device 310, and server 320 may maintain third set of files 406 (and fourth set of files 408) in first memory 330 for a longer time period in response to receiving the user request.

In some implementations, server 320 may generate additional archive information as part of a process to verify that all of the requested files have been retrieved from archival storage device 360. To illustrate, responsive to receiving third set of files 406 from archival storage device 360, server 320 may generate second archive information (e.g., checksums, metadata, etc.) based on the received files. In such implementations, server 320 may compare the second set of archive information to archive information 410 stored at second memory 340. If the second archive information matches archive information 410, server 320 determines that all the requested files have been retrieved, and sends notification 412 to entity device 310. If the second archive information does not match archive information 410, server 320 determines that one or more files have not been retrieved. For example, server 320 may determine the difference between the second archive information and archive information 410 to identify one or more files that have not been retrieved. After identifying the one or more files, server 320 may send an additional request to archival storage device 360 for the one or more files. Alternatively, server 320 may send a second request for the entirety of third set of files 406. Additionally, or alternatively, server 320 may monitor for expiration of a time period and, if third set of files 406 are not received by expiration of the time period, server 320 may transmit an updated request for third set of files 406 to archival storage device 360. In this manner, server 320 monitors the retrieval process and sends additional requests if the retrieval process is not successfully completed, without requiring user input or oversight.

According to yet another embodiment, a system for retrieving archived data is described. The system includes at least one memory (e.g., 330) storing instructions and one or more processors (e.g., 322) coupled to the at least one memory. The one or more processors are configured to execute the instructions to cause the one or more processors to receive a retrieval request (e.g., 402) from an entity (e.g., 310), the retrieval request including an indication of a first set of files (e.g., 406) to be retrieved from an archival storage location (e.g., 360) managed by an archival storage provider distinct from the entity. The one or more processors are further configured to execute the instructions to cause the one or more processors to access archive information (e.g., 410) corresponding to the first set of files, the archive information stored at a first storage location (e.g., 340) managed by an archival storage coordinator distinct from the entity, and initiate transmission of a request (e.g., 404) to the archival storage device based on the archive information. The one or more processors can further be configured to execute the instructions to cause the one or more processors to receive the first set of files from the archival storage device and initiate storage of the first set of files in a second storage location (e.g., 330) managed by the archival storage coordinator. The one or more processors are also configured to execute the instructions to cause the one or more processors to initiate transmission of a notification (e.g., 412) to the entity based on receiving the first set of files, the notification indicating availability of the first set of files at the second storage location.

According to another embodiment, a computer program product is described that includes a computer-readable storage device, such as a non-transitory computer-readable storage medium, that includes instructions that, when executed by one or more processors (e.g., 322), cause the one or more processors to perform operations for retrieving archived data. The operations include executing a first routine to receive a retrieval request (e.g., 402) from an entity (e.g., 310), the retrieval request including an indication of a first set of files (e.g., 406) to be retrieved from an archival storage location (e.g., 360) managed by an archival storage provider distinct from the entity. The operations further include executing a second routine to access archive information (e.g., 410) corresponding to the first set of files, the archive information stored at a first storage location (e.g., 340) managed by an archival storage coordinator distinct from the entity. The operations also include executing a third routine to initiate transmission of a request (e.g., 404) to the archival storage device based on the archival storage information, and executing a fourth routine to receive the first set of files from the archival storage device. The operations also include executing a fifth routine to initiate storage of the first set of files in a second storage location (e.g., 330) managed by the archival storage coordinator, and executing a sixth routine to initiate transmission of a notification (e.g., 412) to the entity based on receiving the first set of files, the notification indicating availability of the first set of files at the second storage location.

Thus, FIG. 4 describes a system (e.g., 400) for the management and retrieval of archived data. For example, server 320 manages storage of archived data by maintaining archive information (e.g., at second memory 340). The archive information may be searched or queried to enable a user to easily select files for retrieval, thereby improving utility of the system. For example, the archive information may be searchable for auditing and/or retrieval purposes. The archive information may be searched by file, by author, to identify changes to a file over a time period, etc. Additionally, server 320 manages the retrieval of the data substantially without user input, which reduces manpower used to retrieve archived data.

Figure 5:
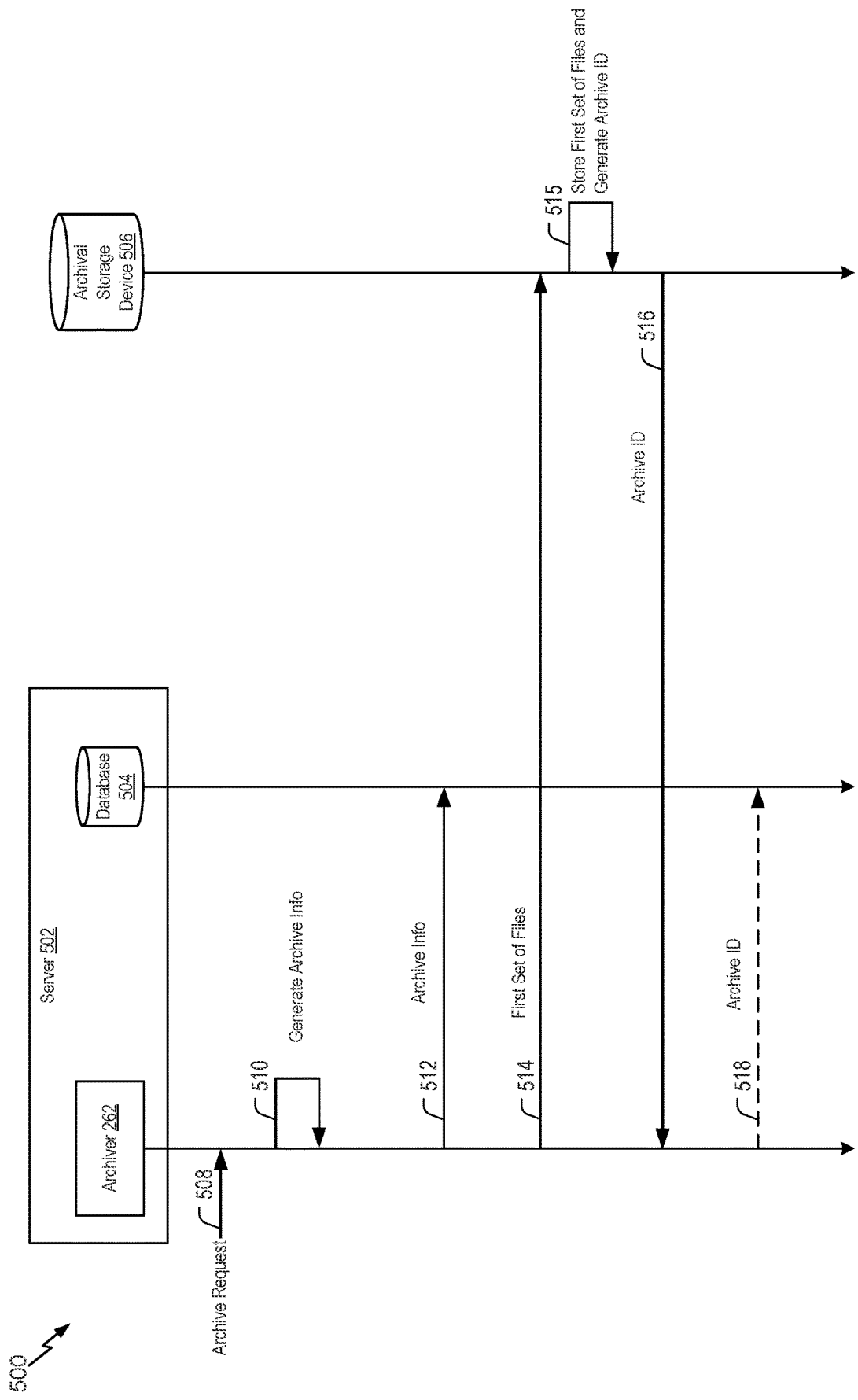
FIG. 5 is a ladder diagram to illustrate an example of a storage transaction.
Figure 6:
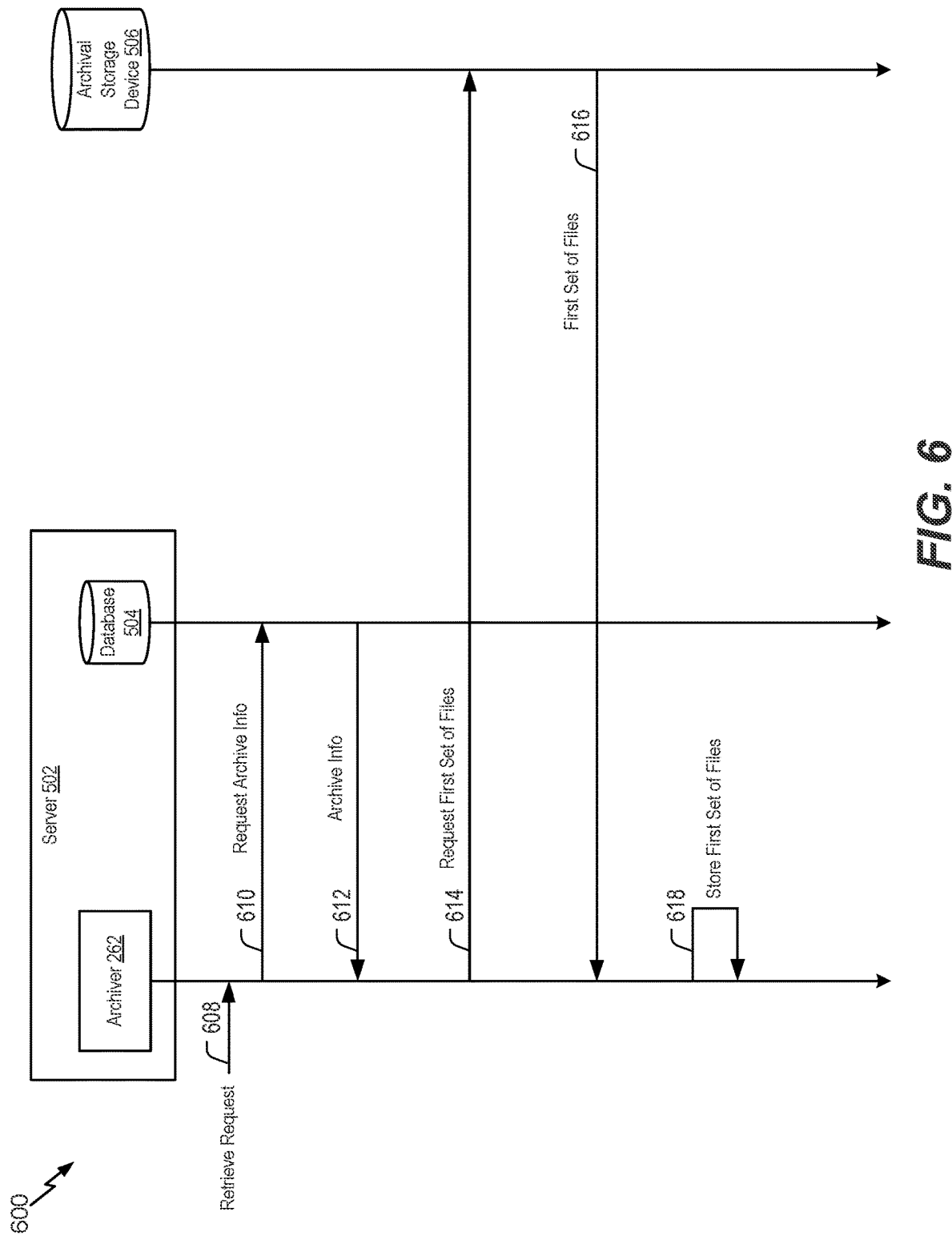
FIG. 6 is a ladder diagram to illustrate an example of a retrieve transaction.

FIGS. 5-9 are ladder diagrams illustrating examples of a distribution transaction of methods of storing data and/or retrieving the data. FIG. 5 depicts a ladder diagram illustrating an example of a storage transaction that is generally designated 500. FIG. 6 depicts a ladder diagram illustrating an example of a retrieval transaction that is generally designated 600. The ladder diagram 500 and/or the ladder diagram 600 includes or corresponds to system 100, 200, 300, 400.

As shown in FIGS. 5 and 6, a system of each of ladder diagrams 500, 600 includes server 502 and an archival storage device 506. Server 502 may include or correspond to repository server 110, 298 or server 320. Server 502 includes archiver 262 and a database 504. Database 504 is configured to store archive information, such as archive information 116, 342, and/or archive log 225. Database 504 may include or correspond to memory 210 or the one or memories (e.g., 330, 340, 350) of server 320. Although database 504 is shown as being included in server 502, in other implementations, database 504 may be separate from server 502. For examples, database 504 may be remote from server 502.

Referring to FIG. 5, during operation, at 508, server 502 (e.g., archiver 262) receives an archive request. The archive request may be generated by an entity device (e.g., 140, 150, 150*a*, 150*b*, 310) or by server 502. The archive request may include or correspond to request 152 or archive file request 316. The archive request may indicate a first set of files. For example, the archive request may include a list of the first set of files, or a build job identifier that corresponds to the first set of files. The first set of files provided by the archival storage device 506 may include or correspond to first set of files 332, second set of files 334, or both.

Archiver 262 initiates generation of and generates archive information, at 510. For example, archiver 262 may initiate generation of the archive information based on or in response to receiving the archive request. The archive information may include or correspond to archive information 116, 342. The archive information is based on the first set of files. For example, the archive information includes checksums corresponding to the first set of files, metadata corresponding to the first set of files, or both.

Archiver 262 stores the archive information at database 504, at 512. For example, to store the archive information at database 504 may initiate generation and/or updating of an archive log (e.g., 225) at database 504. To illustrate, responsive to receiving a request (e.g., instruction) from archiver 262 to store the archive information, database 504 may generate an entry in an archive log and store the archive information such that the archive information is included in or corresponds to the entry.

Archiver 262 sends the first set of files to archival storage device 506, at 514. In some implementations, archiver 262 may send less than all of the first set of files. For example, if a previous set of files has been archived, archiver 262 may only send one or more files representing the difference between the first set of files and the previous set of files. In response to receiving the first set of files, archival storage device 506 stores the first set of files and generates an archive identifier (ID), at 515. The archive ID may include or correspond to storage confirmation information 370. The archive ID may enable and/or be used as part of a retrieve transaction to obtain the first set of files from archival storage device, as described with reference to FIG. 6.

Archival storage device 506 sends the archive ID to server (archiver 262), at 516. For example, the archive ID may be sent as part of a hypertext transfer protocol (HTTP) notification.

Archiver 262 may optionally (as indicated by the dashed line) store the archive ID at database 504, at 518. In some implementations, archiver 262 may update the archive information or an entry in an archive log (e.g., 225) based on (e.g., to include) the archive ID. Additionally, or alternatively, archiver 262 may provide the archive ID to a device and/or entity corresponding to the archive request (at 508).

Thus, FIG. 5 demonstrates storage of data, such as the first set of files (e.g., one or more files) at archival storage device 506. In addition to storage of the data at archival storage device 506, server 502 generates the archive information to enable server 502 to track and/or coordinate storage of the data. The archive information saves storage space (as compared to storing each file at the server) and provides the ability to search archive information for retrieval, for example based on the information and/or metadata including in the archive information. Additionally, storage of data at archival storage device 506 is managed by archiver 262 with little user input or oversite, thereby reducing manpower required to monitor archiving of data.

Referring to FIG. 6, during operation, at 608, server 502 (e.g., archiver 262) receives retrieve request. The retrieve request may be generated by an entity device (e.g., 140, 150, 150*a*, 150*b*, 310) or by server 502. The retrieve request may include or correspond to request 152 or retrieval request 402. The retrieve request may indicate a first set of files. For example, the retrieve request may include a list of the first set of files, or a build job identifier that corresponds to the first set of files. The first set of files may include or correspond to first set of files 332, second set of files 334, or both.

Archiver 262 accesses and/or requests archive information from database 504, at 610, and receives the archive information from database 504, at 612. For example, archiver 262 may access the archive information in response to or based on the retrieval request. The archive information may include or correspond to archive information 116, 342. The archive information may correspond to a first set of files. In some implementations, accessing the archive information may include accessing an archive log (e.g., 225) at database 504, such as an entry of the archive log. Additionally, or alternatively, accessing the archive information may include retrieving an archive ID corresponding to the archive information, such as an archive ID that corresponds to storage of the first set of files at archival storage device 506. The archive ID may include or correspond to storage confirmation information 370. In some implementations, the archive ID may be retrieved and compared to an archive ID provided by the entity device (e.g., in the retrieval request) to confirm that the entity device has access to the requested files (and to determine which files are requested). In some implementations, the entity device may perform a search for archived data, and archiver 262 may provide a list of archived data (e.g., one or more build jobs, one or more sets of files, data sets, etc.) that are archived at archival storage device 506 (based on stored archive information). The request may include or correspond to a selection of one or more of the archived data.

Archiver 262 requests the first set of files from archival storage device 506, at 614. For example, the request for the first set of files may include or correspond to request 404. The request for the first set of files, such as one or more files, may include the archive ID.

Archival storage device 506 provides the first set of files to archiver 262 (e.g., server 502), at 616. For example, archival storage device 506 may retrieve and/or provide the first set of files in response to or based on the request for the first set of files received from archiver 262. The first set of files provided by archival storage device 506 may include or correspond to first set of files 332, second set of files 334, third set of files 406, and/or fourth set of files 408.

Archiver 262 stores the first set of files received, at 618. To illustrate, archiver 262 may store the first set of files at memory 210, at second memory 340, and/or at third memory 350. For example, archiver 262 may locally store the first set of files. After storage of the first set of files at 618, archiver 262 may make the first set of files available for access by an entity device (e.g., 140, 150, 150a, 150b, 310) and/or by another component (e.g., module) of server 502, such as manager 252 and/or analyzer 258, as illustrative, non-limiting examples.

Thus, FIG. 6 demonstrates retrieval of data, such as the first set of files (e.g., one or more files) from archival storage device 506. In the implementation illustrated in FIG. 6, server 502 retrieves the first set of one or more files based on the archive information and/or the archive ID, which allows for searching or archived data using more compact data (e.g., the stored archive information) at database 504 than storage of each individual file. Thus, files may be searched for and retrieved from archival storage device 506 with minimal user interaction (e.g., selection of the files to be retrieved), and archiver 262 monitors and performs the retrieval automatically.

Figure 7:
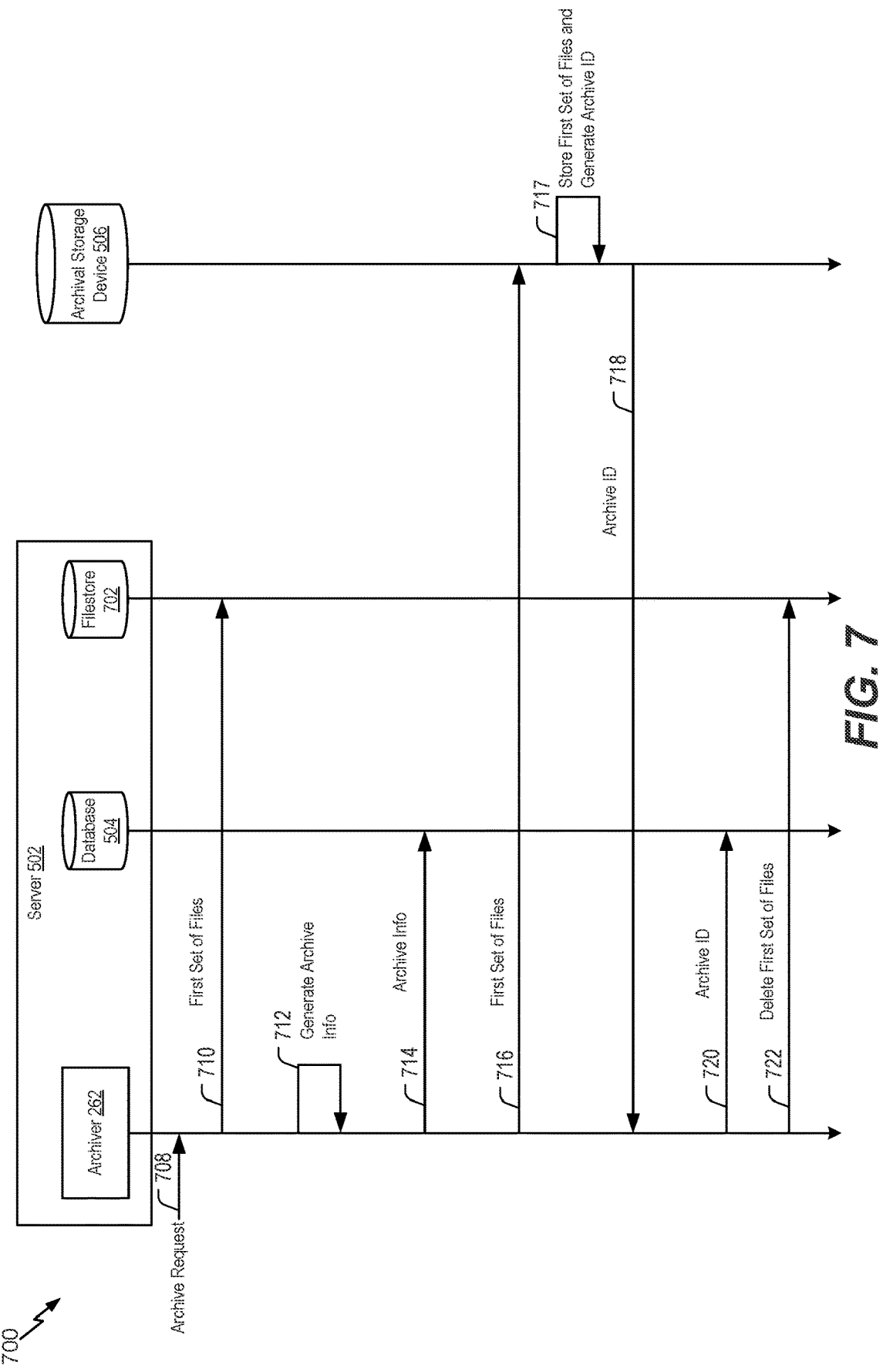
FIG. 7 is a ladder diagram to illustrate another example of a storage transaction.

Referring to FIG. 7, a ladder diagram illustrating an example of a storage transaction is depicted and generally designated 700. For example, the ladder diagram 700 depicts an example to illustrate generation of archive information and storage of a first set of files. The ladder diagram 700 includes or corresponds to system 100, 200, 300, 400.

As shown in FIG. 7, a system of ladder diagram 700 includes server 502 and archival storage device 506. Server 502 may include or correspond to repository server 110, 298 or server 320. Server 502 includes archiver 262, a database 504, and a filestore 702. Database 504 is configured to store archive information, such as archive information 116, 342, and/or archive log 225. Database 504 and/or filestore 702 may include or correspond to memory 210 or the one or memories (e.g., 330, 340, 350) of server 320. Although database 504 and filestore 702 are shown as being included in server 502, in other implementations, database 504 and/or filestore may be separate from server 502. In some implementations, database 504 includes storage for archive information, and filestore 702 includes short term storage, such as a cache, for temporarily storing files until the files can be archived. For example, database 504 may include non-volatile memory and filestore 702 may include volatile memory.

During operation, at 708, server 502 (e.g., archiver 262) receives an archive request. The archive request may be generated by an entity device (e.g., 140, 150, 150a, 150b, 310) or by server 502. The archive request may include or correspond to request 152 or archive file request 316. The archive request may indicate a first set of files. For example, the archive request may include a list of the first set of files (e.g., one or more files), or a build job identifier that corresponds to the first set of files. The first set of files provided by the archival storage device 506 may include or correspond to first set of files 332, second set of files 334, or both.

Archiver 262 stores the first set of files at filestore 702, at 710. For example, the first set of files may be temporarily stored for use in being provided to archival storage device 506, as further described herein.

Archiver 262 initiates generation of and generates archive information, at 712. For example, archiver 262 may initiate generation of the archive information based on or in response to receiving the archive request. The archive information may include or correspond to archive information 116, 342. The archive information is based on the first set of files. For example, the archive information includes checksums corresponding to the first set of files, metadata corresponding to the first set of files, or both.

Archiver 262 stores the archive information at database 504, at 714. For example, to store the archive information at database 504, archiver 262 may initiate generation and/or updating of an archive log (e.g., 225) at database 504. To illustrate, responsive to receiving a request (e.g., instruction) from archiver 262 to store the archive information, database 504 may generate an entry in an archive log and store the archive information such that the archive information is included in or correspond to the entry.

Archiver 262 sends the first set of files to archival storage device 506, at 716. In some implementations, archiver 262 may send less than all of the first set of files. For example, if a previous set of files has been archived, archiver 262 may a portion of the one or more files representing the difference between the first set of files and the previous set of files. In response to receiving the first set of files, archival storage device 506 stores the first set of files and generates an archive identifier (ID), at 717. The archive ID may include or correspond to storage confirmation information 370. The archive ID may enable and/or be used as part of a retrieve transaction to obtain the first set of files from archival storage device, as described with reference to FIG. 6.

Archival storage device 506 sends the archive ID to server 502 (archiver 262), at 718. For example, the archive ID may be sent as part of a HTTP notification.

Archiver 262 stores the archive ID at database 504, at 720. In some implementations, archiver 262 may update the archive information or an entry in an archive log (e.g., 225) based on (e.g., to include) the archive ID. Additionally, or alternatively, archiver 262 may provide the archive ID to a device and/or entity corresponding to the archive request (at 508).

Archiver 262 initiates deletion of the first set of files from the filestore 702, at 722. For example, after receiving the archive ID (e.g., an indication that the first set of files are stored at the archival storage device 506), archiver 262 deletes the corresponding files (e.g., the first set of files) from filestore 702. For example, the files are stored at filestore 702 to be accessible for sending to archival storage locations. For example, if archival storage device 506 fails to store the files, filestore 702 can be accessed, and the files can be re-sent or sent to a different archival storage provider. Once the files are archived, they no longer need to be quickly accessible and thus are deleted from filestore 702.

Thus, FIG. 7 demonstrates storage of data, such as the first set of files (e.g., one or more files) at archival storage device 506. In addition to storage of the data at archival storage device 506, server 502 generates the archive information to enable server 502 to track and/or coordinate storage of the data. The archive information saves storage space (as compared to storing each file at the server) and provides the ability to search archive bundles for retrieval, for example based on the information and/or metadata including in the archive information. Additionally, storage of data at archival storage device 506 is managed by archiver 262 with little user input or oversite, thereby reducing manpower required to monitor archiving of data. Additionally, FIG. 7 illustrates use of filestore 702 as a temporary cache for storing files at server 502 prior to storing the files at archival storage device 506.

Figure 8:
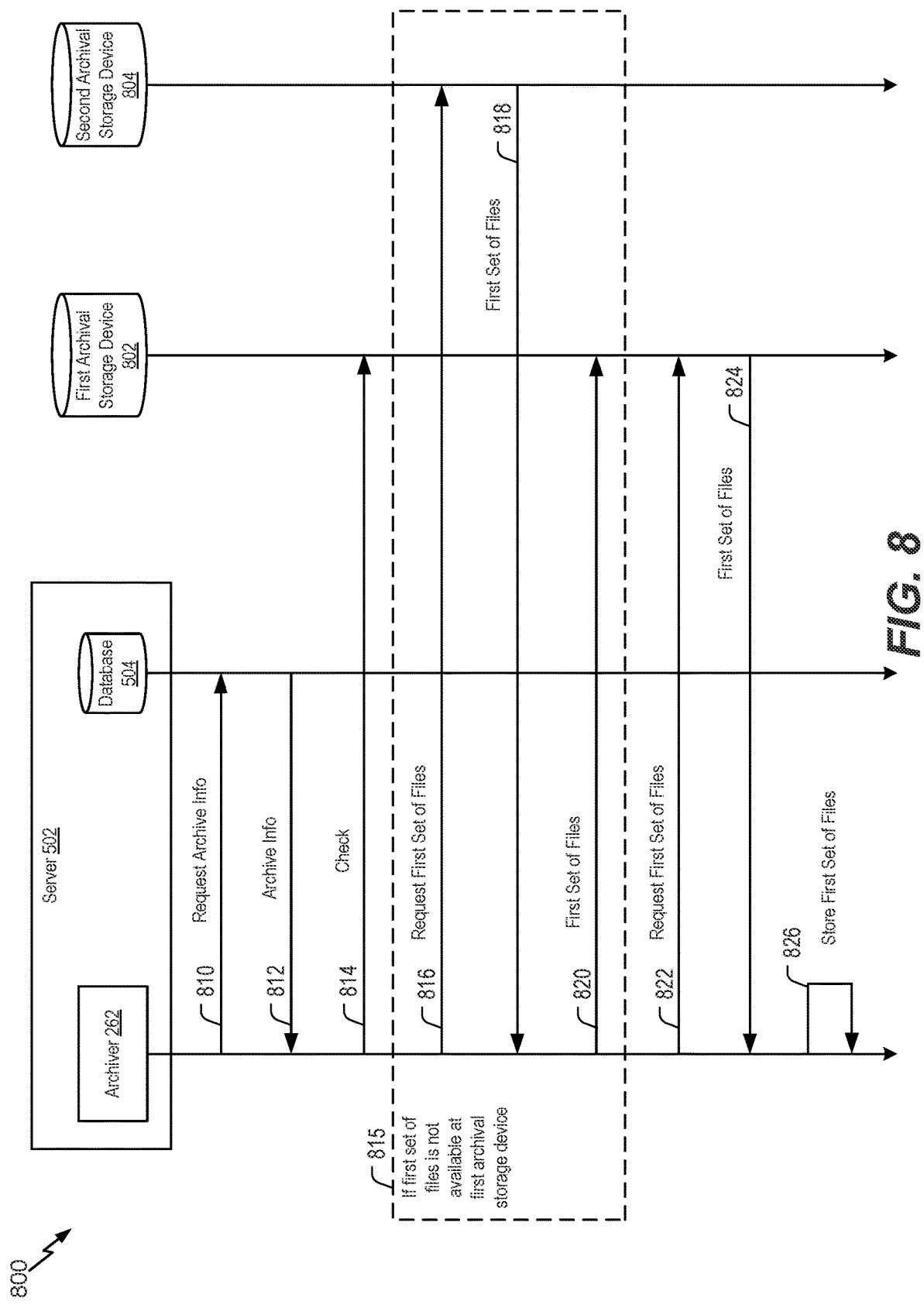
FIG. 8 is a ladder diagram to illustrate another example of a retrieve transaction.

Referring to FIG. 8, a ladder diagram illustrating an example of a retrieval transaction is depicted and generally designated 800. For example, the ladder diagram 800 depicts an example to illustrate retrieval of a first set of files. The ladder diagram 800 includes or corresponds to system 100, 200, 300, 400.

As shown in FIG. 8, a system of ladder diagram 800 includes server 502, a first archival storage device 802, and a second archival storage device 804. Server 502 may include or correspond to repository server 110, 298 or server 320. Server 502 includes archiver 262 and database 504. Database 504 is configured to store archive information, such as archive information 116, 342, and/or archive log 225. Database 504 may include or correspond to memory 210 or the one or memories (e.g., 330, 340, 350) of server 320. Although database 504 is shown as being included in server 502, in other implementations, database 504 may be separate from server 502. In some implementations, server 502 may also include a filestore (e.g., 702). In such implementations, database 504 includes storage for archive information, and the filestore includes short term storage, such as a cache, for temporarily storing files until the files can be archived.

First archival storage device 802 and second archival storage device 804 include archival storage services, such as cloud-based storage services, for storing files and data. In some implementations, first archival storage device 802 and second archival storage device 804 are managed by the same storage provider (e.g., same storage service). Alternatively, first archival storage device 802 and second archival storage device 804 may be managed by different storage providers (e.g., different storage services). In some implementations, first archival storage device 802 has faster access times as compared to second archival storage device 804. Additionally, or alternatively, storage of data at first archival storage device 802 may cost less than storage of data at second archival storage device 804. For example, an amount of money per gigabyte (or other size) of storage may be less at second archival storage device 804 than at first archival storage device 802. In some implementations, server 502 utilizes first archival storage device 802 as a short term cache (e.g., a read-only transaction cache) and utilizes second archival storage device 804 as long term archival storage.

During operation, at 810, archiver 262 requests archive information from database 504, and receives the archive information from database 504, at 812. In some implementations, the archive ID may be retrieved and compared to an archive ID provided by the entity device (e.g., in the retrieval request) to confirm that the entity device has access to the requested files (and to determine which files are requested). In some implementations, the entity device may perform a search for archived data, and archiver 262 may provide a list of archived data (e.g., one or more build jobs, one or more sets of files, data sets, etc.) that are archived at archival storage device 506 (based on stored archive information). The request may include or correspond to a selection of one or more of the archived data. The archive request may be generated by an entity device (e.g., 140, 150, 150a, 150b, 310) or by server 502. The archive request may include or correspond to request 152 or archive file request 316. The archive request may indicate a first set of files. For example, the archive request may include a list of the first set of files, or a build job identifier that corresponds to the first set of files. The first set of files provided by the archival storage device 506 may include or correspond to first set of files 332, second set of files 334, or both.

For example, archiver 262 may access the archive information in response to or based on the retrieval request. The archive information may include or correspond to archive information 116, 342. The archive information may correspond to a first set of files. In some implementations, accessing the archive information may include accessing an archive log (e.g., 225) at database 504, such as an entry of the archive log. Additionally, or alternatively, accessing the archive information may include retrieving an archive ID corresponding to the archive information, such as an archive ID that corresponds to storage of the first set of files at archival storage device 506. The archive ID may include or correspond to storage confirmation information 370.

Archiver 262 checks to determine if the first set of files corresponding to the archive ID is available at first archival storage device 802, at 814. If the first set of files are present at first archival storage device 802, archiver 262 receives a notification indicating that the first set of files are present. Based on the indication that the first set of files are present at first archival storage device 802, archiver 262 sends a request to first archival storage device 802 for the first set of files, at 822. If the first set of files are not present at first archival storage device 802, archiver 262 receives a notification indicating that the first set of files are not present. Based on the indication that the first set of files are not present, archiver 262 accesses second archival storage device 804 to retrieve the first set of files, at 815. To illustrate, archiver 262 sends a request to second archival storage device 804 for the first set of files, at 816. For example, archiver 262 may send the request to second archival storage device 804 in response to receiving the notification that the first set of files are not available at first archival storage device 802. The request for the first set of files, such as one or more files, may include the archive ID.

Second archival storage device 804 provides the first set of files to archiver 262 (e.g., server 502), at 818. For example, second archival storage device 804 may retrieve and/or provide the first set of files in response to or based on the request for the first set of files received from archiver 262. The first set of files provided by second archival storage device 804 may include or correspond to first set of files 332, second set of files 334, third set of files 406, and/or fourth set of files 408. Archiver 262 sends the first set of files to first archival storage device 802 for storage, at 820.

Archiver 262 sends a request to first archival storage device 802 for the first set of files, at 822, and, at 824, archiver 262 receives the first set of files from first archival storage device 802 Archiver 262 stores the first set of files, at 826. To illustrate, archiver 262 may store the first set of files at memory 210, at second memory 340, and/or at third memory 350. For example, archiver 262 may locally store the first set of files. After storage of the first set of files, at 826, archiver 262 may make the first set of files available for access by an entity device (e.g., 140, 150, 150a, 150b, 310) and/or by another component (e.g., module) of server 502, such as manager 252 and/or analyzer 258, as illustrative, non-limiting examples. Although described as storing the first set of files, in other implementations, archiver 262 may provide the first set of files to another device, such as an entity device.

Thus, FIG. 8 demonstrates retrieval of data, such as the first set of files (e.g., one or more files) from second archival storage device 804. In the implementation illustrated in FIG. 8, server 502 retrieves the first set of one or more files based on the archive information and/or the archive ID, which provide the capability to search for archived bundles (e.g., files or data). Additionally, archiver 262 utilizes first archival storage device 802 as a cache to potentially speed up the retrieval process (e.g., if the first set of files are present in first archival storage device 802). Additionally, archiver 262 monitors and controls the retrieval process with little to not input from a user, thereby reducing manpower used to retrieve archived files.

Figure 9:
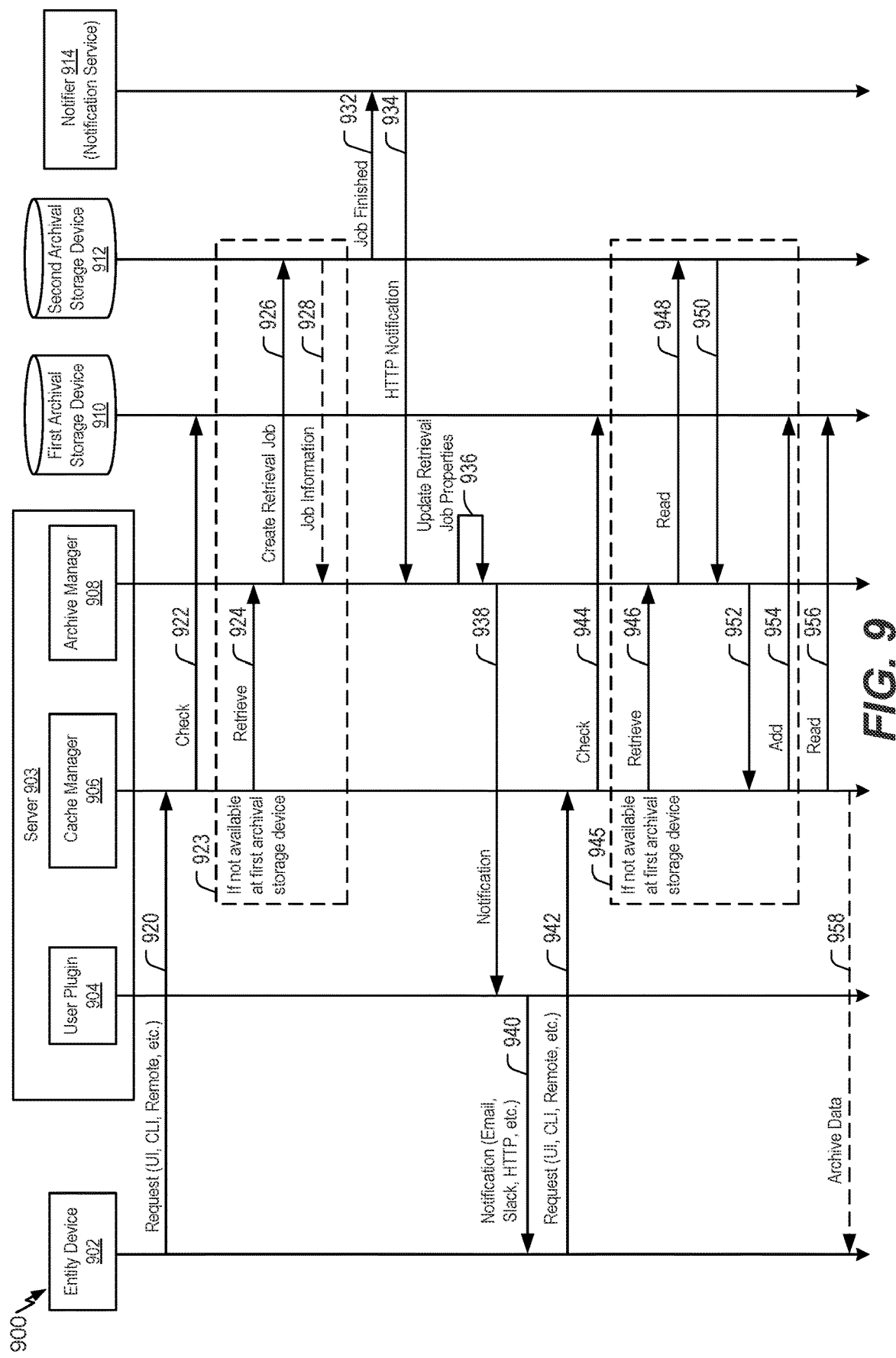
FIG. 9 is a ladder diagram to illustrate another example of a retrieve transaction.

Referring to FIG. 9, a ladder diagram illustrating an example of a retrieval transaction is depicted and generally designated 900. For example, the ladder diagram 900 depicts an example to illustrate retrieval of a first set of files. The ladder diagram 900 includes or corresponds to system 100, 200, 300, 400. As shown, a system of ladder diagram 900 includes an entity device 902, server 903, a first archival storage device 910, a second archival storage device 912, and a notifier 914.

Entity device 902 may include or correspond to entity server 140 and/or entity device 150, 150a, 150b, 310. Server 903 may include or correspond to repository server 110, 298, server 320, or server 502. Server 903 includes a user plugin 904, a cache manager 906, and an archive manager 908. In some implementations, server 903 may include archiver 262. In such implementations, archiver 262 includes user plugin 904, cache manager 906, archive manager 908, or a combination thereof.

User plugin 904 may be configured to provide accessibility to entity device 902. For example, user plugin 904 may provide notifications regarding the status of storage or retrieval jobs at first archival storage device 910 or second archival storage device 912. In some implementations, user plugin 904 includes a user module that includes one or more routines, executable by one or more processors (e.g., the processor 172 of FIG. 1) or processor 250 to provide accessibility to entity device 902.

Cache manager 906 may be configured to manage interactions with first archival storage device 910. For example, cache manager 906 may be configured to check whether particular files are store at first archival storage device 910, to store files at first archival storage device 910, and/or to retrieve files from first archival storage device 910. In some implementations, cache manager 906 includes a cache manager module that includes one or more routines, executable by one or more processors (e.g., the processor 172 of FIG. 1) or processor 250 to manage interactions with first archival storage device 910.

Archive manager 908 may be configured to manage interactions with second archival storage device 912. For example, archive manager 908 may be configured to store files at second archival storage device 912 and/or to retrieve files from second archival storage device 912. Additionally, archive manager 908 may include memory for storing an archive ID received from second archival storage device 912. In some implementations, archive manager 908 includes an archive manager module that includes one or more routines, executable by one or more processors (e.g., the processor 172 of FIG. 1) or processor 250 to manage interactions with second archival storage device 912.

First archival storage device 910 and second archival storage device 912 include archival storage services, such as cloud-based storage services, for storing files and data. In some implementations, first archival storage device 910 and second archival storage device 912 are managed by the same storage provider. Alternatively, first archival storage device 910 and second archival storage device 912 may be managed by different storage providers. In some implementations, first archival storage device 910 has faster access times as compared to second archival storage device 912. Additionally, or alternatively, storage of data at first archival storage device 910 may cost less than storage of data at second archival storage device 912. For example, an amount of money per gigabyte (or other size) of storage may be less at first archival storage device 910 than at second archival storage device 912. In some implementations, server 903 utilizes first archival storage device 910 as a short term cache (e.g., a read-only transaction cache) and utilizes second archival storage device 912 as long term archival storage.

Notifier 914 (e.g., a notification service) may be configured to provide notifications when jobs are complete at first archival storage device 910 or second archival storage device 912. For example, notifier 914 may provide a notification when a storage job is complete at second archival storage device 912. In some implementations, notifier 914 includes a notifier module that includes one or more routines, executable by one or more processors (e.g., the processor 172 of FIG. 1) or processor 250 to provide notifications when jobs are complete at first archival storage device 910 or second archival storage device 912.

During operation, at 920, entity device 902 sends a request to cache manager 906 (e.g., server 903). The request can be from a user interface (UI), a command line interface (CLI), a remote device, etc. The request may indicate a first set of files. For example, the request may include a list of the first set of files, or a build job identifier that corresponds to the first set of files. The first set of files provided by the archival storage device 506 may include or correspond to first set of files 332, second set of files 334, or both. Cache manager 906 may access archive information based on the request to determine the one or more files to be retrieved, or other information, such as an archive ID. In some implementations, entity device 902 may request to search through archived bundles, and the request may be a selection from a displayed list of archived bundles (e.g., sets of files). Additionally, the archive information may be accessed to retrieve an archive ID, for comparison with an archive ID provided by the entity device or for use in retrieving one or more files.

Cache manager 906 checks to determine if the first set of files is available at first archival storage device 910, at 922. For example, the check may be based on an archive ID retrieved from archive information stored at server 903. In response to the request, cache manager 906 receives a notification indicating whether the first set of files are present at first archival storage device 910. If the first set of files are present at first archival storage device 910, cache manager 906 initiates a retrieval operation (e.g., 956) to receive the first set of files from first archival storage device 910 and provides the first set of files to entity device 902, at 958. Alternatively, if the first set of files are not present at first archival storage device 910, cache manager 906 initiates operations at archive manager 908, at 923. To illustrate, cache manager 906 sends a retrieve instruction to archive manager 908, at 924.

Archive manager 908 creates a retrieval job at second archival storage device 912 based on the retrieve instruction. To create the retrieval job, archive manager 908 may generate and/or update job properties. For example, the job properties may include or correspond to archive log 225.

Second archival storage device 912 initiates the retrieval job to obtain the set of one or more files from storage. When initiating the retrieval job, second archival storage device 912 generates job information, such as a job identifier, to track the retrieval job. In some implementations, second archival storage device 912 device may optionally, as indicated by a dashed line, send the job information to archive manager 908, at 928.

After completion of the retrieval job by second archival storage device 912, second archival storage device 912 sends a job finished notification to notifier 914, at 932. After receiving the job finished notification, notifier 914 sends a notification to archive manager 908, at 934. For example, notifier 914 may send a HTTP notification to archive manager 908.

Archive manager 908 updates the retrieval job properties to indicate that the second archival storage device 912 has retrieved the first set of file information, at 936. Additionally, archive manager 908 sends a notification to user plugin 904, at 938, and user plugin 904 sends a notification to entity device 902, at 940. The notification from the archive manager 908 and/or the notification from user plugin 904 may indicate that the second archival storage device 912 has retrieved the first set of files In some implementations, the notification to the entity device may be an HTTP notification, an e-mail notification, a slack notification, or another type of notification.

After receiving the notification, entity device 902 sends a request to cache manager 906 (e.g., server 903), at 942. Cache manager 906 checks to determine if the first set of files is available at first archival storage device 910, at 944. If the first set of files are present at first archival storage device 910, cache manager 906 receives a notification indicating that the first set of files are present. Based on the indication that the first set of files are present at first archival storage device 802, cache manager 906 sends a request to first archival storage device 910 for the first set of files, at 956.

If the first set of files are not present at first archival storage device 910, cache manager 906 receives a notification indicating that the first set of files are not present. Based on the indication that the first set of files are not present, server 903 accesses second archival storage device 912 to retrieve the files, at 945. To illustrate, cache manager 906 sends a retrieve request to archive manager 908, at 946. Archive manager 908 sends a request to second archival storage device 912 for the first set of files, at 948. The request for the first set of files, such as one or more files, may include the archive ID.

Second archival storage device 912 provides the first set of files to archive manager 908 (e.g., server 903), at 950. For example, second archival storage device 912 may retrieve and/or provide the first set of files in response to or based on the request for the first set of files received from archive manager 908. The first set of files provided by second archival storage device 912 may include or correspond to first set of files 332, second set of files 334, third set of files 406, and/or fourth set of files 408. Archive manager 908 sends the first set of files to cache manager 906, at 952. Cache manager 906 sends the first set of files to first archival storage device 910 for storage, at 954.

Cache manager 906 performs a read operation on first archival storage device 910 to retrieve the archived data, at 956. Cache manager 906 optionally provides the archived data to entity device 902. Alternatively, cache manager 906 stores the archived data at server 903 and makes the stored data available to entity device 902.

Thus, FIG. 9 demonstrates retrieval of data, such as the first set of files (e.g., one or more files) from first archival storage device 910 and/or second archival storage device 912. In the implementation illustrated in FIG. 9, server 903 retrieves the first set of one or more files based on the archive information and/or the archive ID, which provide the capability to search for archived bundles (e.g., files or data). Additionally, server 903 utilizes first archival storage device 910 as a cache to potentially speed up the retrieval process (e.g., if the first set of files are present in first archival storage device 910). Additionally, server 903 monitors and controls the retrieval process with little to not input from a user, thereby reducing manpower used to retrieve archived files.

Although FIGS. 6-9 describe storage of files in archival storage devices, such disclosure is not intended to be limiting. For example, storage of files in archival storage devices may include storage of files at archival storage locations (e.g., particular addresses in the archival storage devices). Additionally, in some implementations, archival storage locations may span multiple archival storage devices (e.g., data may be partitioned across multiple archival storage devices).

Figure 10:
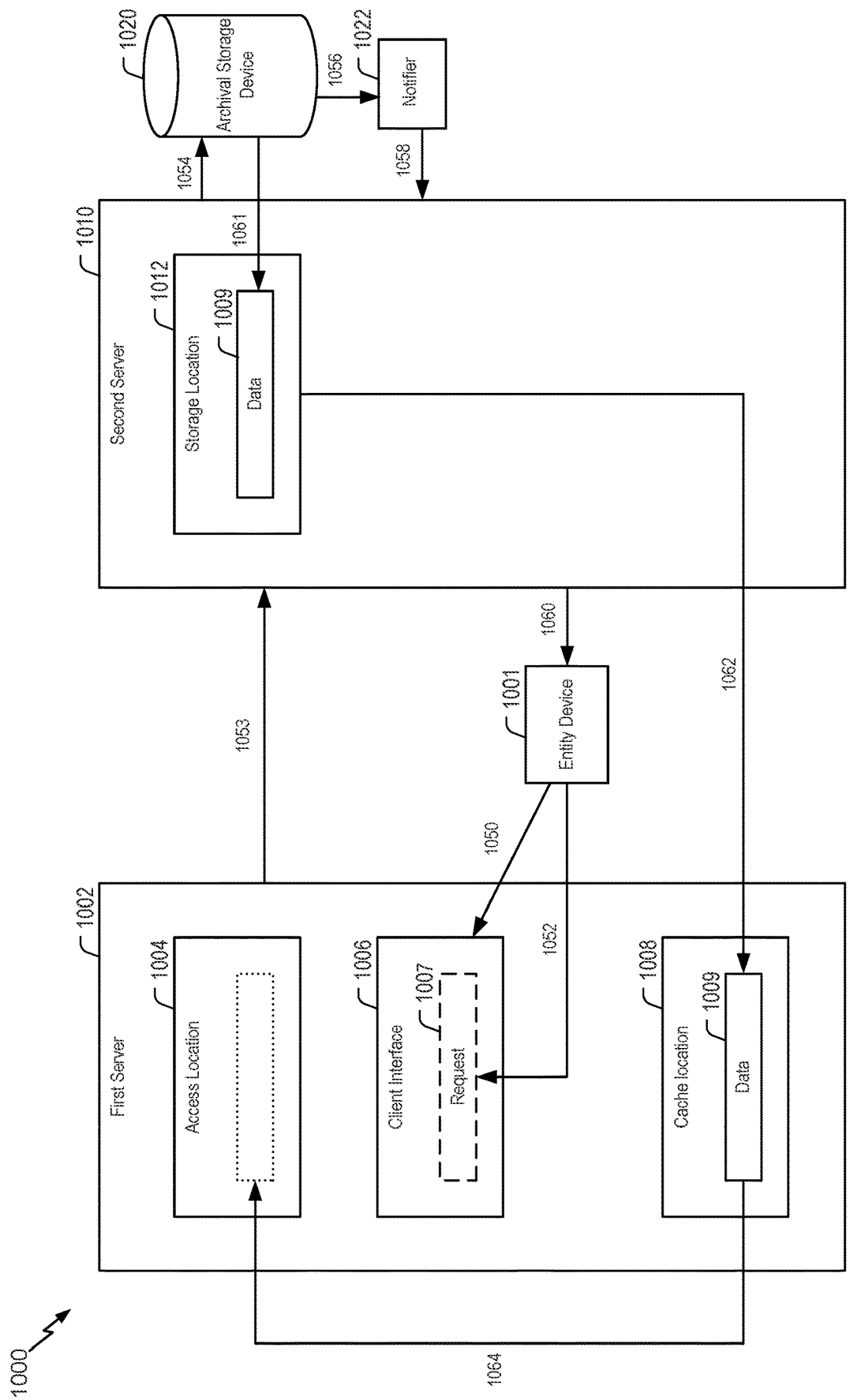
FIG. 10 is a block diagram of an example of a system to retrieve data.
Figure 11:
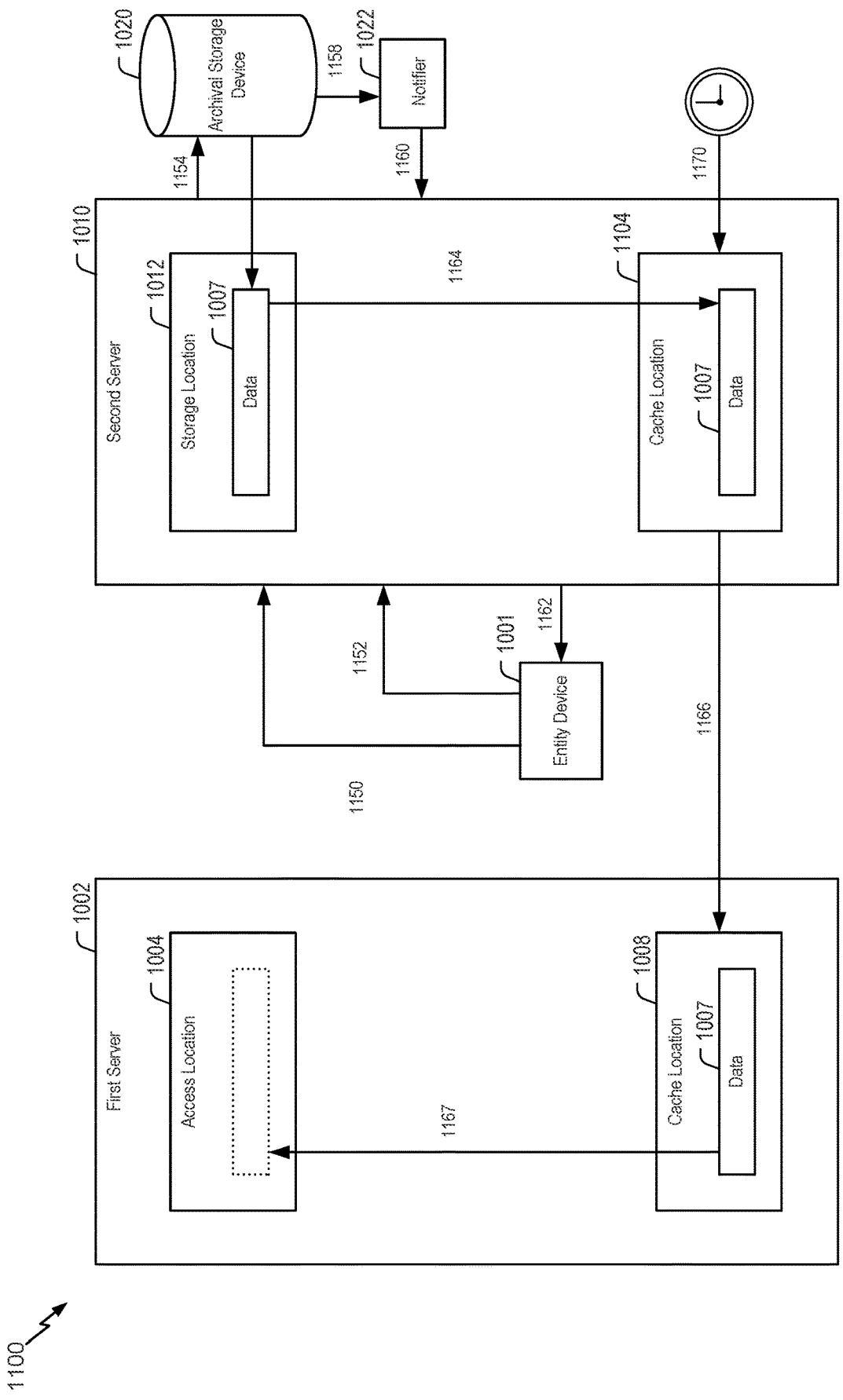
FIG. 11 is a block diagram of another example of a system to retrieve data.

Referring to FIGS. 10 and 11, examples of systems for archival and retrieval of data. For example, FIG. 10 is a block diagram of a system 1000 to generate, manage, and/or retrieve archived data, and FIG. 11 is a block diagram of a system 1100 to generate, manage, and/or retrieve archived data. System 1000 may include or correspond to at least a portion of system 100, system 200, system 300, system 400, one or more of the systems of FIGS. 5-9, or a combination thereof. System 1000 includes an entity device 1001, a first server 1002, a second server 1010, an archival storage device 1020, and a notifier 1022.

Entity device 1001 may include or correspond to entity server 140, entity 150, 150*a*, 150*b*, entity device 310, or entity device 902. First server 1002 and/or second server 1010 may include or correspond to server 110, server 298, server 320, server 502, or server 903. First server 1002 may be designated for storage of files that are frequently accessed, and second server 1010 may be designated for storage of files that are retrieved from archival storage device 1020 (e.g., files that are not frequently accessed). In some implementations, first server 1002 and second server 1010 may be separate servers. In other implementations, first server 1002 and second server 1010 are each included in the same server. For example, a sever may be logically or virtually partitioned into a first portion (e.g., first server 1002) and a second portion (e.g., a second server 1010).

Archival storage device 1020 may include or correspond to archive server 164, archival storage device 360, archival storage device 506, first archival storage device 802, second archival storage device 804, first archival storage device 910, or second archival storage device 912. Notifier 1022 may include or correspond to notifier 914.

Referring to FIG. 10, during operation of system 1000, entity device 1001 accesses a client interface 1006 at first server 1002, at 1050. At 1052, entity device 1001 provides a request 1007 for archived data. For example, entity device 1001 may identify data 1009, such as one or more artifacts.

First server 1002 instructs second server 1010 to initiate retrieval of data 1009 from archival storage device 1020, at 1053. Second server 1010 initiates a retrieval job for archival storage device 1020 to retrieve data 1009 stored at archival storage device 1020, at 1054.

Archival storage device 1020 performs the retrieval job and, after completion of the retrieval job, archival storage device 1020 provides an indication to notifier 1022 that the retrieval job is finished, at 1056. Notifier 1022 notifies second server 1010, at 1058, and second server 1010 notifies entity device 1001 that the retrieval job is finished, at 1060.

Second server 1010 receives data 1009 from archival storage device 1020 and the data is stored at storage location 1012, at 1061. At 1062, second server 1010 sends data 1009 to cache location 1008 of first server 1002. First server 1002 transfers data 1009 from cache location 1008 to access location 1004, at 1064. First server 1002 may notify entity device 1001 that data 1009 is accessible from access location 1004. In some implementations, entity device 1001 may initiate transfer of data from cache location 1008 and/or may identify access location 1004 for storage of data 1009.

In some implementations, second server 1010 sends data 1009 to cache location 1008 responsive to a second user request from entity device 1001. In this manner, accidental downloads from second server 1010 to first server 1002 can be prevented (or reduced) by requiring a second user request before the downloading (e.g., transferring) process. In other implementations, second server 1010 sends data 1009 to cache location 1008 without waiting for a second user request, which reduces user input needed to perform the retrieval process.

Referring to FIG. 11, during operation of system 11000, entity device 1001 identifies data (e.g., artifacts) to be retrieved via second server 1010, at 1150. Entity device 1001 requests the data via second server 1010, at 1152.

Second server 1010 initiates a retrieval job for archival storage device 1020 to retrieve the data stored at archival storage device 1020, at 1154. Archival storage device 1020 performs the retrieval job and, after completion of the retrieval job, archival storage device 1020 provides an indication to notifier 1022 that the retrieval job is finished, at 1158. Notifier 1022 notifies second server 1010, at 1160, and second server 1010 notifies entity device 1001 that the retrieval job is finished, at 1162.

Second server 1010 receives data 1009 from archival storage device 1020 and the data is stored at storage location 1012. At 1164, second server 1010 sends data to a cache location 1104 of second server 1010. Second server 1010 copies the retrieved data to a cache location 1008 of first server 1002, at 1166. In some implementations, at 1167, first server 1002 moves data 1009 from cache location 1008 to an access location 1004 that is designated by or accessible to entity device 1001. A time based event cleanup (e.g., a cleanup module) of second server 1010 removes the data from cache location 1104, at 1170, after expiration of a time period.

In some implementations, operation of system 1100 provides a more streamlined process than operation of system 1000 because a second user request is not received during the retrieval process. To reduce or prevent accidental downloads to first server 1002, a second user request could be added to operation of system 1100, as described with reference to FIG. 10.

Figure 12:
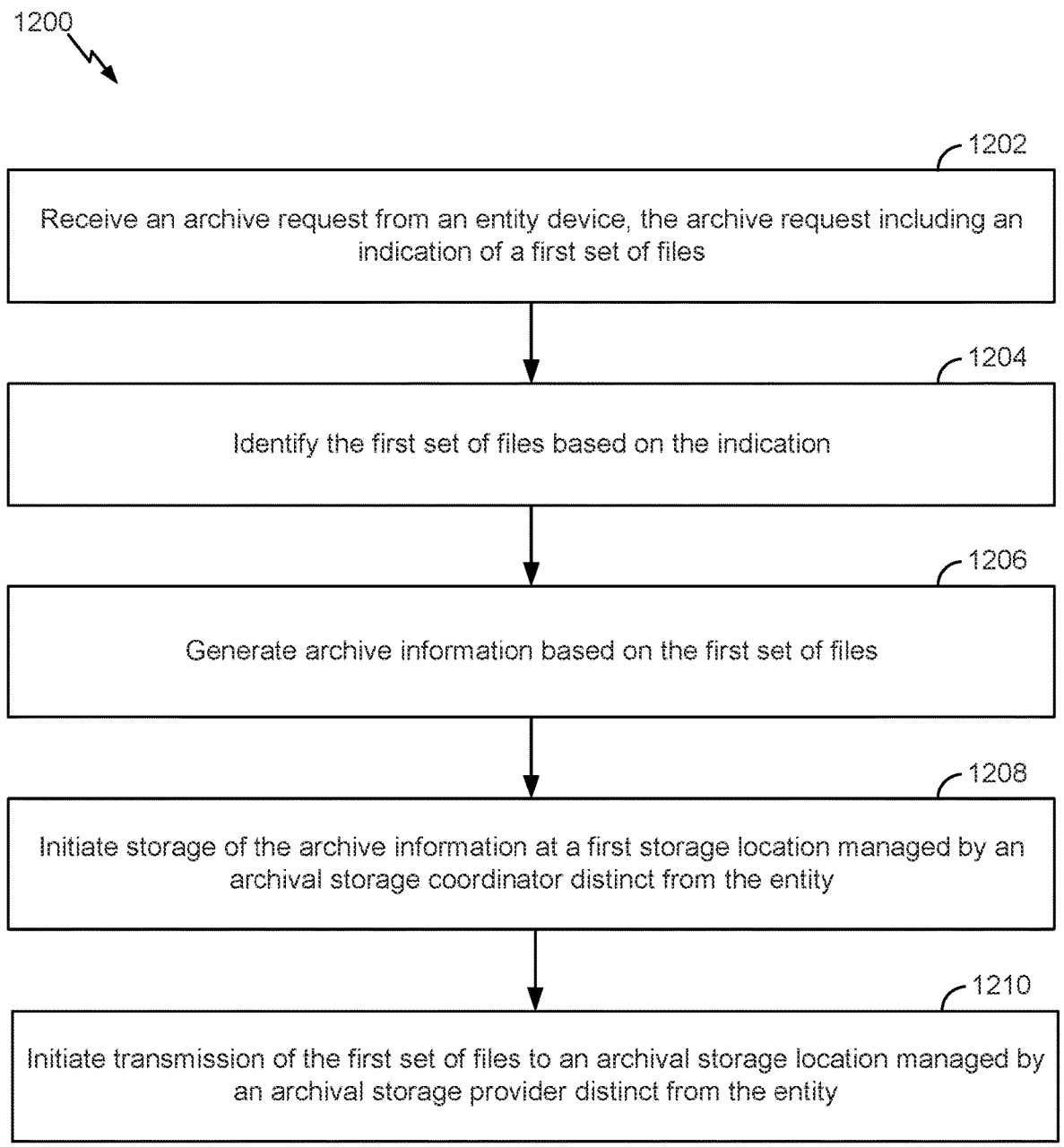
FIG. 12 is a flow diagram of an example of a method for generating and managing archived data.
Figure 13:
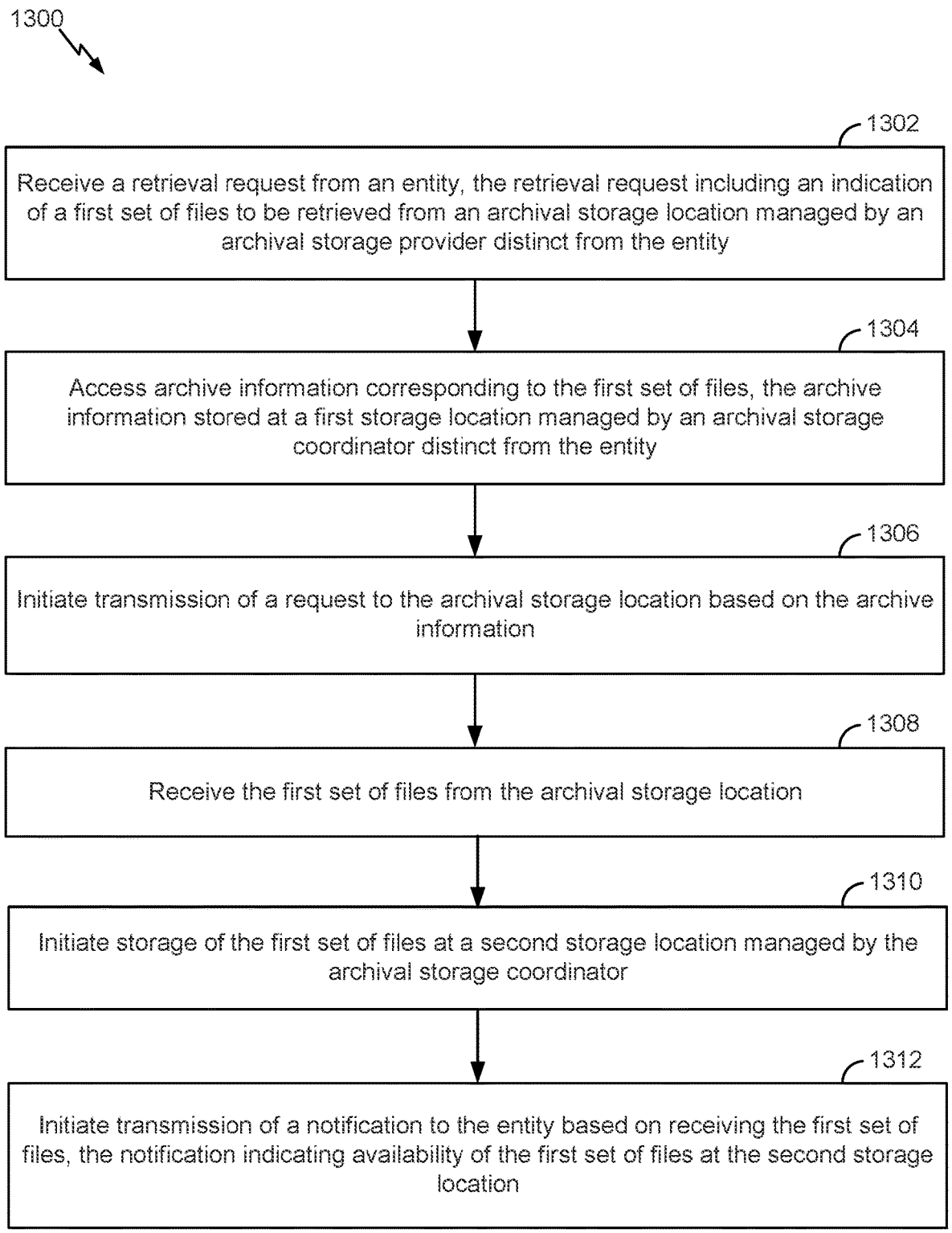
FIG. 13 is a flow diagram of an example of a method for managing and retrieving archived data.

FIGS. 12 and 13 are flow diagrams of methods of managing, storing, and retrieving archived data. Each of the methods of FIGS. 12-13 may be stored in a computer-readable storage medium as instructions that, when executed by one or more processors, cause the one or more processors to perform the operations of the method (e.g., 1200, 1300).

Referring to FIG. 12, a flow diagram of a method for archiving data according to an embodiment is shown as a method 1200. In a particular implementation, method 1200 may be performed by server 110, 298 (e.g., one or more processors 250, 322, and/or archiver 262), server 320, server 502, and/or server 903.

At 1202, method 1200 includes receiving an archive request from an entity, the archive request including an indication of a first set of files. For example, server 320 may include archive file request 316 from entity device 310. Archive file request 316 may include an indication of a first set of files.

At 1204, method 1200 includes identifying the first set of files based on the indication. For example, server 320 may identify first set of files 332 in a memory, such as first memory 330.

At 1206, method 1200 includes generating archive information based on the first set of files. For example, server 320 generates archive information 342 based on the first set of files indicated by archive file request 316.

At 1208, method 1200 includes initiating storage of the archive information at a first storage location managed by an archival storage coordinator distinct from the entity. For example, server 302 may store archive information 342 at second memory 340 (e.g., a first storage location).

At 1210, method 1200 includes initiating transmission of the first set of files to an archival storage location managed by an archival storage provider distinct from the entity. For example, server 320 may initiate transmission of first set of files 332 to archival storage device 360 for storage at memory 364 (e.g., an archival storage location).

In a particular implementation, a second set of files shares interdependencies with the first set of files, and the archive information is further generated based on the second set of files. For example, second set of files 334 may share interdependencies with first set of files 332, and archive information 342 may be further generated based on second set of files 334. In some such implementations, method 1200 further includes initiating transmission of the second set of files to the archival storage location for storage. For example, server 320 may initiate transmission of second set of files 334 to archival storage device 360 for storage at memory 364 (e.g., the archival storage location).

In a particular implementation, the first set of files includes one or more parts, and generating the archive information includes, for each part of the one or more parts, generating a checksum and generating a checksum for an entirety of the first set of files. For example, archive information 342 may include checksum 344, which includes checksums for each file (or part) of the first set of files 332, a checksum for an entirety of the first set of files 332, or a combination thereof. Additionally, or alternatively, the archive information further includes metadata corresponding to each file of the first set of files, metadata corresponding to the entirety of the first set of files, or both. For example, archive information 342 may include metadata 346 that includes metadata corresponding to each of first set of files 332, metadata corresponding to an entirety of first set of files 332, or both.

In a particular implementation, the archive request further includes the first set of files, and method 1200 further includes storing the first set of files in a different storage location than the archive information. For example, first set of files 332 may be stored in first memory 330, and archive information 342 may be stored in second memory 340.

In a particular implementation, method 1200 includes receiving a second archive request from the entity, the second archive request including an indication of a third set of files, generating second archive information based on the third set of files, and initiating storage of the second archive information at the first storage location For example, server 320 may generate and store second archive information based on the third set of files at second memory 340. In some such implementations, method 1200 further includes determining a difference between the third set of files and the first set of files and initiating transmission to the archival storage location of at least one file corresponding to the difference for storage. For example, server 320 may determine at least one file that is different between first set of files 332 and the third set of files, and server 320 may initiate transmission of the at least one file to archival storage device 360 for storage (as compared to storing an entirety of the third set of files).

In a particular implementation, method 1200 further includes selecting the archival storage location from a plurality of archival storage locations based on the archive information or based on an option presented to the entity. For example, server 320 may select archival storage device 360 (e.g., memory 364) from a plurality of archival storage locations based on archive information 342 (e.g., based on a type of data included in the archive request, a size of the data, a frequency of access, etc.) or based on an option presented to entity device 310. Additionally, or alternatively, method 1200 may further include receiving a query from the entity and identifying the first set of files based on the query. The indication of the first set of files corresponds to a selection of results of the query. For example, server 320 may receive a query from entity device 310, the query for one or more archive information, and first set of files 332 may be identified based on results of the query.

In a particular implementation, method 1200 further includes receiving storage confirmation information from the archival storage location and updating the archive information based on the storage confirmation information. For example, server 320 may receive storage confirmation information 370 from archival storage device 360 and may update archive information 342 based on storage confirmation information 370.

In a particular implementation, the archive information includes metadata associated with the first set of files, the metadata including an indication of whether the first set of files successfully completed one or more development stages of a development process. For example, metadata 346 may indicate whether first set of files 332 successfully completed one or more development stages of a development process. Additionally, or alternatively, the archive information is immutable.

Thus, method 1200 describes the generation, management, and storage of archived data. For example, a server manages storage of archived data by generating and storing archive information along with transmitting the corresponding files to archival storage location for storage. The archive information may be searched or queried, improving utility of a system that performs method 1200.

Referring FIG. 13, a flow diagram of a method for retrieving archived data according to an embodiment is shown as a method 1300. In a particular implementation, method 1300 may be performed by server 110, 298 (e.g., one or more processors 250, 322, and/or archiver 262), server 320, server 502, and/or server 903.

At 1302, method 1300 includes receiving a retrieval request from an entity, the retrieval request including an indication of a first set of files to be retrieved from an archival storage location managed by an archival storage provider distinct from the entity. For example, server 320 may receive retrieval request 402 from entity device 310. Retrieval request 402 may include an indication of third set of files 406.

At 1304, method 1300 includes accessing archive information corresponding to the first set of files, the archive information stored at a first storage location managed by an archival storage coordinator distinct from the entity. For example, server 320 may access archive information 410 stored at second memory 340. Archive information 410 may correspond to third set of files 406.

At 1306, method 1300 includes initiating transmission of a request to the archival storage location based on the archive information. For example, server 320 may initiate transmission of request 404 to archival storage device 360.

At 1308, method 1300 includes receiving the first set of files from the archival storage location. For example, server 320 may receive third set of files 406 from archival storage device 360.

At 1310, method 1300 includes initiating storage of the first set of files at a second storage location managed by the archival storage coordinator. For example, server 320 may initiate storage of third set of files 406 at first memory 330.

At 1312, method 1300 includes initiating transmission of a notification to the entity based on receiving the first set of files, the notification indicating availability of the first set of files at the second storage location. For example, server 320 may initiate transmission of notification 412 to entity device 310. Notification 412 may indicate availability of third set of files 406 at first memory 330.

In a particular implementation, method 1300 includes receiving a search parameter, initiating a display of one or more archive information of a plurality of archive information, the one or more archive information satisfying the search parameter, and receiving a selection of the archive information from the one or more archive information. For example, server 320 may receive a search parameter from entity device 310 and may initiate display of one or more archive information stored at first memory 330 that satisfy the search parameter. Retrieval request 402 may include or correspond to selection of archive information 410 by the entity device 310 based on the display.

In a particular implementation, method 1300 further includes transferring the first set of files from the second storage location to a third storage location based on a user request, the third storage location accessible to the entity. For example, server 320 may transfer third set of files 406 from first memory 330 to third memory 350, which may be accessible to entity device 310.

In a particular implementation, method 1300 further includes determining whether a threshold time period has elapsed since storage of the first set of files at the second storage location. For example, server 320 may determine whether a threshold time period has elapsed since storage of third set of files 406 at first memory 330. In some such implementations, method 1300 further includes deleting the first set of files based on a determination that the threshold time period has elapsed. For example, server 320 may delete third set of files 406 from first memory 330 based on a determination that the threshold time period has elapsed. Additionally, or alternatively, method 1300 may further include maintaining the first set of files in the second storage location responsive to receipt of a user request. For example, based on a user request from entity device 310, server 320 may maintain third set of files 406 in first memory 330.

In a particular implementation, method 1300 includes receiving a request for archived file information from the entity and initiating transmission of the archived file information to the entity, the archived file information indicating a plurality of archived information that corresponds to files stored at the archival storage device. For example, server 320 may receive a request for archived file information from entity device 310 and may transmit an indication of the archived file information stored at second memory 340 to entity device 310. In some such implementations, method 1300 further includes receiving a selection from the entity of the archived information of the plurality of archived information. For example, retrieval request 402 may indicate a selection of archive information 410 from the plurality of archived information.

In a particular implementation, the retrieval request further includes storage information associated with the one or more files; and the archive information is accessed based on the storage information. For example, retrieval request 402 may include an archive ID, and third set of files 406 may be retrieved from archival storage device 360 using the archive ID.

In a particular implementation, method 1300 includes generating second archive information based on the first set of files after receiving the first set of files and comparing the archive information to the second archive information. For example, responsive to receiving third set of files 406, server 320 may generate second archive information based on third set of files 406, and server 320 may compare the second archive information to archive information 410. In some such implementations, the notification is transmitted based on the archive information matching the second archive information. For example, notification 412 may be transmitted based on the second archive information (based on the received files) matching archive information 410 stored at first memory 330. In some such implementations, method 1300 further includes initiating transmission a second request for one or more of the first set of files to the archival storage location based on the archive information failing to match the second archive information. For example, if the second archive information does not match archive information 410, one or more files may not have been received and thus, server 420 transmits a second request for the missing files.

In a particular implementation, method 1300 includes, based on expiration of a time threshold without receiving the first set of files, initiating transmission of an updated request to the archival storage location. For example, if server 320 does not receive third set of files 406 within a time threshold, server 320 transmits an updated request to archival storage device 360. In some such implementations, method 1300 further includes updating the archive information with additional information, the additional information including a requester of the first set of files, a time of a request, a date of the request, a search term corresponding to the request, or any combination thereof. For example, archive information 410 may be updated when third set of files 406 is requested from archival storage device 360.

In a particular implementation, method 1300 further includes accessing the archive information to identify storage information associated with the first set of files. The storage information include an identifier, a storage date, a user identifier, a duration of storage, or any combination thereof; and the request is based on the storage information. For example, server 320 may access archive information 410 to determine an archive ID used in request 404.

Thus, method 1300 describes a method for the management and retrieval of archived data. For example, a server manages archived data by accessing archive information stored at a storage location. The storage information may be searched or queries, providing a user with a simple and easy method to select archived files for retrieval.

Each of the methods of FIGS. 12-13 may be stored in a computer-readable storage medium as instructions that, when executed by one or more processors, cause the one or more processors to perform the operations of the method (e.g., 1200, 1300). In some such implementations, method(s) also includes generating one or more graphical user interfaces (GUIs) via which the search results are displayed, queries are displayed, notifications of storage or retrieval of files are displayed, or a combination thereof.

In some implementations, methods 1200, 1300 and/or operations described with reference to at least FIG. 5-9 can be combined such that one or more operations described with reference to one of the methods of FIGS. 12-13 and one or more operations described above with reference to FIGS. 5-9 may be combined with one or more operations of another of FIGS. 12-13 and the processes of FIGS. 5-9. For example, one or more operations of method 1200 may be combined with one or more operations of method 1300. Additionally, or alternatively, one or more operations described above with reference to FIG. 5 may be combined with one or more operations of one of FIGS. 12-13 or of a combination of FIGS. 12-13.

In some aspects, techniques for supporting generation and management of archived data may include additional aspects, such as any single aspect or any combination of aspects described below or in connection with one or more other processes or devices described elsewhere herein. In some aspects, supporting generation and management of the archived data may include a system configured to receive, from an entity, an archive request including an indication of a first set of files. The system is also configured to identify or retrieve the first set of files from the entity based on the indication, generate archive information based on the first set of files, and initiate storage of the archive information at a first storage location managed by an archival storage coordinator distinct from the entity. The system is further configured to initiate transmission of the first set of files to an archival storage location managed by an archival storage provider distinct from the entity. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the processor. The processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a first aspect, a second set of files shares interdependencies with the first set of files.

In a second aspect, in combination with the first aspect, the archive information is further generated based on the second set of files.

In a third aspect, in combination with the second aspect, the system is further configured to initiate transmission of the second set of files to the archival storage location.

In a fourth aspect, alone or in combination with one or more of the first through third aspects, the first set of files includes one or more parts.

In a fifth aspect, in combination with the fourth aspect, to generate the archive information, the system is further configured to, for each part of the one or more parts, generate a checksum.

In a sixth aspect, in combination with the fifth aspect, the system is further configured to generate a checksum for an entirety of the first set of files.

In a seventh aspect, in combination with the sixth aspect, the archive information further includes metadata corresponding to each file of the first set of files, metadata corresponding to the entirety of the first set of files, or both.

In an eighth aspect, alone or in combination with one or more of the first through seventh aspects, the archive request further includes the first set of files.

In a ninth aspect, in combination with the eighth aspect, the system is further configured to store the first set of files in a different storage location than the archive information stored at the first storage location.

In a tenth aspect, alone or in combination with one or more of the first through ninth aspects, the system is further configured to receive a second archive request from the entity. In some implementations, the second archive request includes an indication of a third set of files.

In an eleventh aspect, in combination with the tenth aspect, the system is further configured to generate second archive information based on the third set of files.

In a twelfth aspect, in combination with the eleventh aspect, the system is further configured to initiate storage of the second archive information at the first storage location.

In a thirteenth aspect, in combination with the twelfth aspect, the system is further configured to determine a difference between the third set of files and the first set of files.

In a fourteenth aspect, in combination with the thirteenth aspect, the system is further configured to initiate transmission to the archival storage location of at least one file corresponding to the difference for storage.

In a fifteenth aspect, alone or in combination with one or more of the first through fourteenth aspects, the system is further configured to select the archival storage location from a plurality of archival storage locations based on the archive information or based on an option presented to the entity.

In a sixteenth aspect, alone or in combination with one or more of the first through fifteenth aspect, the system is further configured to receive a query from the entity.

In a seventeenth aspect, alone or in combination with one or more of the first through sixteenth aspects, the system is further configured to identify the first set of files based on the query.

In an eighteenth aspect, alone or in combination with one or more of the first through seventeenth aspects, the indication of the first set of files corresponds to a selection of results of the query.

In a nineteenth aspect, alone or in combination with one or more of the first through eighteenth aspects, the system is further configured to receive storage confirmation information from the archival storage location.

In a twentieth aspect, alone or in combination with one or more of the first through nineteenth aspects, the system is further configured to update the archive information based on the storage confirmation information.

In a twenty-first aspect, alone or in combination with one or more of the first through twentieth aspects, the archive information includes metadata associated with the first set of files.

In a twenty-second aspect, alone or in combination with one or more of the first through twenty-first aspects, the metadata includes an indication of whether the first set of files successfully completed one or more development stages of a development process.

In a twenty-third aspect, alone or in combination with one or more of the first through twenty-second aspects, the system is further configured to receive a retrieval request from the entity. In some implementations, the retrieval request indicates the first set of files.

In a twenty-fourth aspect, in combination with the twenty-third aspect, the system is further configured to access the archive information at the first storage location In a twenty-fifth aspect, in combination with the twenty-fourth aspect, the system is further configured to initiate transmission of a request to the archival storage location based on the archive information.

In a twenty-sixth aspect, in combination with the twenty-fifth aspect, the system is further configured to retrieve the first set of files from the archival storage location.

In a twenty-seventh aspect, in combination with the twenty-sixth aspect, the system is further configured to initiate storage of the first set of files at a second storage location managed by the archival storage coordinator.

In a twenty-eighth aspect, in combination with the twenty-seventh aspect, the system is further configured to initiate transmission of a notification to the entity based on the first set of files.

In a twenty-ninth aspect, in combination with the twenty-eighth aspect, the notification indicates availability of the first set of files at the second storage location.

In a thirtieth aspect, in combination with the twenty-ninth aspect, the system is further configured to receive a search parameter.

In a thirty-first aspect, in combination with the thirtieth aspect, the system is further configured to initiate a display of one or more archive information of a plurality of archive information. In some implementations, the one or more archive information satisfies the search parameter.

In a thirty-second aspect, in combination with the thirty-first aspect, the system is further configured to receive a selection of the archive information from the one or more archive information.

In a thirty-third aspect, in combination with one or more of the twenty-ninth through thirty-second aspects, the system is further configured to transfer the first set of files from the second storage location to a third storage location based on a user request.

In a thirty-fourth aspect, in combination with the thirty-fourth aspect, the third storage location is accessible to the entity.

In a thirty-fifth aspect, in combination with one or more of the twenty-ninth through thirty-third aspects, the system is further configured to determine whether a threshold time period has elapsed since storage of the first set of files at the second storage location.

In a thirty-sixth aspect, in combination with the thirty-fifth aspect, the system is further configured to delete the first set of files based on a determination that the threshold time period has elapsed.

In a thirty-seventh aspect, in combination with the thirty-fifth aspect, the system is further configured to maintain the first set of files in the second storage location responsive to receipt of a user request.

In a thirty-eighth aspect, in combination with one or more of the twenty-ninth through thirty-seventh aspects, the system is further configured to receive a request for archived file information from the entity.

In a thirty-ninth aspect, in combination with the thirty-eighth aspect, the system is further configured to initiate transmission of the archived file information to the entity.

In a fortieth aspect, in combination with the thirty-ninth aspect, the archived file information indicates a plurality of archived information that corresponds to files stored at the archival storage location.

In a forty-first aspect, in combination with the fortieth aspect, the system is further configured to receive a selection from the entity of the archived information of the plurality of archived information.

In a forty-second aspect, in combination with one or more of the twenty-ninth through forty-first aspects, the retrieval request further includes storage information associated with the one or more files.

In a forty-third aspect, in combination with the forty-second aspect, the archive information is accessed based on the storage information.

In a forty-fourth aspect, in combination with one or more of the twenty-ninth through forty-third aspects, the system is further configured to generate second archive information based on the first set of files after receipt of the first set of files.

In a forty-fifth aspect, in combination with the forty-fourth aspect, the system is further configured to compare the archive information to the second archive information.

In a forty-sixth aspect, in combination with the forty-fourth aspect, the notification is transmitted based on the archive information matching the second archive information.

In a forty-seventh aspect, in combination with the forty-fourth aspect, the system is further configured to initiate transmission a second request for one or more of the first set of files to the archival storage location based on the archive information failing to match the second archive information.

In some aspects, a system is configured to receive a retrieval request from an entity. The retrieval request includes an indication of a first set of files to be retrieved from an archival storage location managed by an archival storage provider distinct from the entity. The system is also configured to access archive information corresponding to the first set of files. The archive information is store at a first storage location managed by an archival storage coordinator distinct from the entity. The system is further configured to initiate transmission of a request to the archival storage location based on the archive information, receive the first set of files from the archival storage location, initiate storage of the first set of files at a second storage location managed by the archival storage coordinator, and initiate transmission of a notification to the entity based on receiving the first set of files. The notification indicates availability of the first set of files at the second storage location. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the processor. The processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a forty-eighth aspect, the system is further configured to receive a search parameter.

In a forty-ninth aspect, in combination with the forty-eighth aspect, the system is further configured to initiate a display of one or more archive information of a plurality of archive information. In some implementations, the one or more archive information satisfying the search parameter.

In a fiftieth aspect, in combination with the forty-ninth aspect, the system is further configured to receive a selection of the archive information from the one or more archive information.

In a fifty-first aspect, alone or in combination with one or more of the forty-eighth through fiftieth aspects, the system is further configured to transfer the first set of files from the second storage location to a third storage location based on a user request.

In a fifty-second aspect, in combination with the fifty-first aspect, the third storage location is accessible to the entity.

In a fifty-third aspect, alone or in combination with one or more of the forty-eighth through fifty-second aspects, the system is further configured to determine whether a threshold time period has elapsed since storage of the first set of files at the second storage location.

In a fifty-fourth aspect, in combination with the fifty-third aspect, the system is further configured to delete the first set of files based on a determination that the threshold time period has elapsed.

In a fifty-fifth aspect, in combination with the fifty-third aspect, the system is further configured to maintain the first set of files in the second storage location responsive to receipt of a user request.

In a fifty-sixth aspect, alone or in combination with one or more of the first through fifty-fifth aspects, the system is further configured to receive a request for archived file information from the entity.

In a fifty-seventh aspect, in combination with the fifty-sixth aspect, the system is further configured to initiate transmission of the archived file information to the entity.

In a fifty-eighth aspect, in combination with the fifty-seventh aspect, the archived file information indicates a plurality of archived information that corresponds to files stored at the archival storage location.

In a fifty-ninth aspect, in combination with the fifty-eighth aspect, the system is further configured to receive a selection from the entity of the archived information of the plurality of archived information.

In a sixtieth aspect, in combination with one or more of the first through fifty-ninth aspects, the retrieval request further includes storage information associated with the one or more files.

In a sixty-first aspect, in combination with the sixtieth aspects, the archive information is accessed based on the storage information.

In a sixty-second aspect, alone or in combination with one or more of the first through sixty-first aspects, the system is further configured to generate second archive information based on the first set of files after receipt of the first set of files.

In a sixty-third aspect, in combination with the sixty-second aspect, the system is further configured to compare the archive information to the second archive information.

In a sixty-fourth aspect, in combination with one or more of the sixty-second through sixty-third aspects, the notification is transmitted based on the archive information matching the second archive information.

In a sixty-fifth aspect, in combination with the sixty-second through sixty-fourth aspects, the system is further configured to initiate transmission a second request for one or more of the first set of files to the archival storage location based on the archive information failing to match the second archive information.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for generating and managing archived data, the method comprising:
    receiving, by one or more processors of a computing device, an archive request from an entity device, the archive request including an indication of a software build job or a software release;
    initiating, by the one or more processors, storage of archive information at a first storage location, the archive information based on the software build job or the software release;
    initiating, by the one or more processors, transmission of an archive bundle comprising a first set of files of the software build job or the software release to an archival storage location for storage, the archival storage location distinct from the first storage location;
    receiving, by the one or more processors, storage confirmation information from the archival storage location, the storage confirmation information including an archive identifier (ID) corresponding to the first set of files stored at the archival storage location; and
    updating, by the one or more processors, the archive information at the first storage location to include the archive ID.

2. The method of claim 1, where the first storage location comprises a memory of the computing device.

3. The method of claim 1, where the first storage location comprises a cloud-based storage device.

4. The method of claim 1, further comprising:
    identifying, by the one or more processors, a second set of files that share interdependencies with the first set of files; and
    including, by the one or more processors, the second set of files in the archive bundle prior to transmission of the archive bundle.

5. The method of claim 4, where the archive information is further generated based on the second set of files.

6. The method of claim 1, further comprising:
identifying, by the one or more processors and based on the indication, a first file of the first set of files stored at a memory of the computing device;
receiving, by the one or more processors, a second file of the first set of files from the entity device; and
generating, by the one or more processors, the archive information based on the first set of files including the first file and the second file.

7. The method of claim 1, where:
the first set of files includes one or more parts;
generating the archive information comprises, for each part of the one or more parts, generating a corresponding checksum; and
the archive information comprises the checksums corresponding to each file of the first set of files and metadata corresponding to each file of the first set of files.

8. The method of claim 1, where:
the first set of files includes one or more parts;
generating the archive information comprises generating a checksum for an entirety of the first set of files; and
the archive information comprises the checksum for the entirety of the first set of files and metadata corresponding to the entirety of the first set of files.

9. The method of claim 1, further comprising:
receiving, by the one or more processors, a second archive request from the entity device, the second archive request including an indication of an updated version of the software build job or the software release;
determining, by the one or more processors, a difference between a third set of files of the updated version of the software build job or the software release and the first set of files; and
initiating, by the one or more processors, transmission of at least one file corresponding to the difference to the archival storage location for storage.

10. The method of claim 9, further comprising:
generating, by the one or more processors, second archive information based on the third set of files; and
initiating, by the one or more processors, storage of the second archive information at the first storage location.

11. A system for generating and managing archived data, the system comprising:
at least one memory storing instructions; and
one or more processors coupled to the at least one memory, the one or more processors configured to execute the instructions to cause the one or more processors to:
receive an archive request from an entity device, the archive request including an indication of a software build job or a software release;
initiate storage of archive information at a first storage location, the archive information based on the software build job or the software release;
initiate transmission of an archive bundle comprising a first set of files of the software build job or the software release to an archival storage location for storage, the archival storage location distinct from the first storage location;
receive storage confirmation information from the archival storage location, the storage confirmation information including an archive identifier (ID) corresponding to the first set of files stored at the archival storage location; and
update the archive information at the first storage location to include the archive ID.

12. The system of claim 11, where the archive bundle comprises a single coherent archive bundle.

13. The system of claim 11, where the archive information includes metadata associated with the first set of files, the metadata including an indication of whether the first set of files has successfully completed one or more development stages of a development process corresponding to the software build job or the software release.

14. The system of claim 11, where the one or more processors are further configured to:
receive a retrieval request from the entity device, the retrieval request indicating the first set of files;
access the archive information at the first storage location;
initiate transmission of a request to the archival storage location based on the archive information;
retrieve the archive bundle from the archival storage location;
initiate storage of the first set of files at a second storage location; and
initiate transmission, to the entity device, of a notification indicating availability of the first set of files at the second storage location.

15. A method for management and retrieval of archived data, the method comprising:
receiving, by one or more processors of a computing device, a retrieval request from an entity device, the retrieval request including an indication of an archive bundle to be retrieved from an archival storage location, the archival bundle comprising a first set of files of a software build job or a software release;
accessing, by the one or more processors, archive information stored at a first storage location, the archive information corresponding to the software build job or the software release;
initiating, by the one or more processors, transmission of a request to the archival storage location, the request comprising an archive identifier (ID) included in the archive information; and
receiving, by the one or more processors, the archive bundle comprising the first set of files from the archival storage location based on the transmission of the request.

16. The method of claim 15, further comprising:
initiating, by the one or more processors, storage of the first set of files at a second storage location; and
initiating, by the one or more processors, transmission to the entity device of a notification indicating availability of the first set of files at the second storage location.

17. The method of claim 16, further comprising transferring, by the one or more processors, the first set of files from the second storage location to a third storage location based on receipt of a user request, the third storage location accessible to the entity device.

18. The method of claim 16, further comprising:
determining, by the one or more processors, whether a threshold time period has elapsed since storage of the first set of files at the second storage location; and
deleting, by the one or more processors, the first set of files from the second storage location based on a determination that the threshold time period has elapsed.

19. The method of claim 15, where:
the first storage location is managed by an archival storage coordinator;
the archival storage location is managed by an archival storage provider; and the archival storage coordinator and the archival storage provider are distinct from an entity corresponding to the entity device.

20. The method of claim 15, where:
the first storage location comprises a remote database; and
the archival storage location comprises a cloud-based storage device.

21. The method of claim 15, further comprising:
receiving, by the one or more processors, a search parameter from the entity device prior to receiving the retrieval request; and
initiating, by the one or more processors, a display of archive information corresponding to a plurality of archived software build jobs or software releases, the displayed archive information satisfying the search parameter, where the indication of the archive bundle included in the retrieval request corresponds to a selection from the displayed archive information.

22. The method of claim 21, where the archive information corresponding to the plurality of archived software build jobs or software releases is stored at the first storage location and is searchable prior to retrieval of any archive bundle from the archival storage location.

23. The method of claim 15, where:
the retrieval request further includes storage information associated with the first set of files; and
the archive information is accessed based on the storage information.

24. The method of claim 15, further comprising:
generating, by the one or more processors, second archive information based on the first set of files included in the archive bundle received from the archival storage location; and
comparing, by the one or more processors, the archive information accessed from the first storage location to the second archive information; and
initiating, by the one or more processors, transmission of a notification of successful retrieval of the archive bundle to the entity device based on the archive information matching the second archive information.

25. The method of claim 24, further comprising initiating, by the one or more processors, transmission of a second request for the archive bundle to the archival storage location based on the archive information failing to match the second archive information.

26. The method of claim 15, further comprising:
initiating, by the one or more processors and prior to transmission of the request to the archival storage location, transmission of a second request to a second archival storage location, the second request comprising the archive ID included in the archive information; and receiving, by the one or more processors, a second notification from the second archival storage location, the second notification indicating that the archive bundle is not available at the second archival storage location,
where transmission of the request to the archival storage location is based on receipt of the second notification.

27. A system for management and retrieval of archived data, the system comprising:
at least one memory storing instructions; and
one or more processors coupled to the at least one memory, the one or more processors configured to execute the instructions to cause the processor to:
receive a retrieval request from an entity device, the retrieval request including an indication of an archive bundle to be retrieved from an archival storage location, the archival bundle comprising a first set of files of a software build job or a software release;
access archive information stored at a first storage location, the archive information corresponding to the software build job or the software release;
initiate transmission of a request to the archival storage location, the request comprising an archive identifier (ID) included in the archive information; and
receive the archive bundle comprising the first set of files from the archival storage location.

28. The system of claim 27, where the one or more processors are further configured to, based on expiration of a time threshold without receiving the archive bundle from the archival storage location, initiate transmission of an updated request to the archival storage location.

29. The system of claim 27, where the one or more processors are further configured to update the archive information with additional information, the additional information comprising a requester of the archive bundle, a time of the retrieval request, a date of the retrieval request, a search term corresponding to the retrieval request, or any combination thereof.

30. The system of claim 27, where:
the one or more processors are configured to access the archive information to identify storage information associated with the archive bundle;
the storage information comprises a storage date corresponding to the archive bundle, a user identifier that initiate storage of the archive bundle, a duration of storage of the archive bundle, or any combination thereof; and
the request to the archival storage location includes the storage information.

* * * * *